United States Patent [19]
Chida

[11] Patent Number: 5,930,405
[45] Date of Patent: Jul. 27, 1999

[54] IMAGE CHANGE SENSING AND STORAGE APPARATUS AND METHOD

[75] Inventor: Makoto Chida, Kunitachi, Japan

[73] Assignee: Canon Kabushiki Kaisha, Tokyo, Japan

[21] Appl. No.: 08/563,701

[22] Filed: Nov. 28, 1995

[30] Foreign Application Priority Data

Nov. 28, 1994 [JP] Japan .................................. 6-293131
Oct. 18, 1995 [JP] Japan .................................. 7-270012

[51] Int. Cl.⁶ ............................... G06T 3/40; G06T 7/20
[52] U.S. Cl. ........................ 382/284; 382/299; 382/312; 348/155; 348/218; 348/358
[58] Field of Search ................................ 382/218, 299, 382/298, 240, 217, 312, 236, 305, 284; 348/219, 143, 152, 154, 155, 218, 240, 347, 358

[56] References Cited

U.S. PATENT DOCUMENTS

| | | | |
|---|---|---|---|
| 4,383,170 | 5/1983 | Takagi et al. ............................. | 348/218 |
| 4,589,030 | 5/1986 | Kley ......................................... | 348/218 |
| 4,633,506 | 12/1986 | Kato ......................................... | 382/232 |
| 4,742,558 | 5/1988 | Ishibashi et al. ........................ | 382/232 |
| 4,947,260 | 8/1990 | Reed et al. ............................... | 358/447 |
| 5,018,023 | 5/1991 | Kubota ..................................... | 358/450 |
| 5,123,056 | 6/1992 | Wilson ..................................... | 382/284 |
| 5,153,936 | 10/1992 | Morris et al. ............................ | 395/128 |
| 5,185,667 | 2/1993 | Zimmerman ............................. | 382/293 |
| 5,325,206 | 6/1994 | Fujita et al. .............................. | 348/358 |
| 5,331,407 | 7/1994 | Doi et al. ................................. | 356/394 |
| 5,515,181 | 5/1996 | Iyoda et al. .............................. | 358/474 |
| 5,579,412 | 11/1996 | Ando ........................................ | 382/240 |
| 5,649,032 | 7/1997 | Bart et al. ................................. | 382/284 |
| 5,666,157 | 9/1997 | Aviv ......................................... | 348/152 |

*Primary Examiner*—Jon Chang
*Attorney, Agent, or Firm*—Morgan & Finnegan, L.L.P.

[57] ABSTRACT

A still image of high resolution is stored as a reference image. Regarding images which are inputted later, they are inputted at lower resolution and analyzed, then if any portion differing from the reference image is found, an image section in an area including the differing portion is sensed at higher resolution, and information on the sensed image section is stored. Thereby, data representing a large number of image is stored in a memory having relatively small capacity.

48 Claims, 24 Drawing Sheets

FIG. 15

| No. | FILE NAME TO BE UPDATED | UPDATED TIME | UPDATED AREA | | | UPDATING PROCESS | ATTRIBUTES |
|-----|---|---|---|---|---|---|---|
| | | | TOP COORDINATES | NUMBER OF PIXELS IN HORIZONTAL DIRECTION | NUMBER OF PIXELS IN VERTICAL DIRECTION | | |
| 1 | | | | | | | |
| 2 | | | | | | | |
| 3 | | | | | | | |
| 4 | | | | | | | |
| 5 | | | | | | | |
| 6 | | | | | | | |
| 7 | | | | | | | |
| 8 | | | | | | | |
| 9 | | | | | | | |
| 10 | | | | | | | |
| 11 | | | | | | | |
| 12 | | | | | | | |

IMAGE CHANGE SENSING AND STORAGE APPARATUS AND METHOD

BACKGROUND OF THE INVENTION

The present invention relates to an image sensing apparatus and method which senses an image of an object and, more particularly, to an image sensing apparatus and method which stores a plurality of images obtained by sensing an object.

In a conventional image sensing apparatus, such as a video camera for sensing images used for TV, its resolution is not high enough to handle a still image of high definition. The number of effective pixels inputted from a typical video camera is about 400,000 per screen. Further, an image sensed by the video camera is generally outputted as standard video signals (e.g., NTSC, PAL, SECAM).

Therefore, in order to obtain a high quality still image by using a conventional video camera, a method in which an entire image to be inputted is divided into a plurality of sections, an image for each section is inputted, then the plurality of inputted image sections are combined to constitute a single still image of high quality is used.

Referring to FIG. 22, a configuration and an operation of a conventional image input apparatus will be described below. Reference numeral 1 denotes a camera unit for sensing images of a person, document, picture, and the like; 2, a camera controller used for changing image sensing area of the camera unit 1; 3, an input image processing unit for converting image signals inputted from the camera unit 1 to image data so as to be used for various purposes; 4, a memory input controller for designating memory area and controlling timing when inputting the image data which is outputted from the input image processing unit 3; 5, a memory for temporarily storing the image data; 6, a memory output controller for designating memory area and controlling timing when reading image data from the memory 5 and for transmitting the read image data to a main controller 7; 7, the main controller for controlling entire processing since the image is inputted, processed and outputted; 8, a storage unit for storing image data; 9, a display for displaying image data; 10, an output unit for printing image data; and 11, a communication unit for sending/receiving image data to/from other terminal.

Next, an operation of the aforesaid configuration for inputting a high definition image is described below. In the operation, an image area to be sensed is divided into a plurality of sections, and the divided image sections of the image are sequentially inputted, then the inputted image sections are combined to reproduce a single still picture of high quality.

First, the camera controller 2 controls the camera unit 1 in accordance with designation from the main controller 7 so that the image sensing area of the camera unit 1 is set at a desired position. Next, image signals inputted by the camera unit 1 enter the input image processing unit 3, and converted into image data.

If the image signals are composite signals, such as NTSC and PAL, then the input image processing unit 3 separates the signals into Y signals (luminance signals) and C signals (color difference signals), further performs color difference separation on the C signals to separate the signals into Cr and Cb signals. The obtained Y signals, Cr signals, and Cb signals are then A/D converted. Further, if color space conversion is necessary, the signals are processed with color space conversion so as to be changed into R (red) signals, G (green) signals, and B (blue) signals. Furthermore, if format conversion, resolution conversion, or enlargement/compression process is necessary, then the signals are processed with a pixel density conversion and related interpolation which is performed by using filters or the like.

As described above, the processed image data is stored in an area, designated by the memory input controller 4, of the memory 5.

By repeating the aforesaid operation as many times as the number of the divided sections, all the image data of the entire image sensing area is stored in the memory 5.

Thereafter, the image data of each section is combined and composed, thereby obtaining image data for a single still image of high resolution. If the high resolution still image is to be outputted on a paper sheet, then the main controller 7 transmits the image data to the output unit 10 where the image is outputted. Further, if the still image is to be stored, then the main controller 7 transmits the image data to the storage unit 8 and store it. Furthermore, if the still image is to be displayed, then the main controller 7 transmits the image data to the display 9 where the still image is displayed, and if to be transmitted to another device placed at distance or to other terminal, then transmits the image data to the communication unit 11 where the image data is transmitted to outside.

FIGS. 23 and 24 are flowcharts showing the aforesaid operation.

Specifically, FIG. 23 shows a case of inputting a still image of high resolution, whereas FIG. 24 shows a case of outputting a still image of high resolution.

Referring to FIG. 23, first, whether or not inputting a still image is determined (S231). If it is not, then a moving image is inputted from the camera unit 1 (S243), and the input moving image is transmitted to the display 9 and displayed there.

In a case of inputting a still image, resolution for inputting the still image is set (S232). In an example, image sensing ability of a typical video camera in an image sensing area is 768 pixels in the horizontal direction and 494 lines in the vertical direction in a case of NTSC, and 752 pixels in the horizontal direction and 582 lines in the vertical direction in a case of PAL. The resolution of the video camera can be obtained by dividing the image sensing ability by the size of the image sensing area.

Since it is possible to improve resolution, as described above, by inputting an image portion by portion, the number of sections into which an image sensing area is to be divided (referred as "frame division number" hereinafter) is set in order to input a still image of higher resolution than the resolution based on the aforesaid image sensing ability (S234).

Next, an image inputting process will be described.

First, the camera controller 2 controls the camera unit 1 to sense an image section, the first section, of an image sensing area divided on the basis of a frame division number (S237).

Thereafter, the image section, the first section, is inputted by the camera unit 1 and processed by the input image processing unit 3 (S238). Then, the processed image data is stored in a designated area of the memory 5 by the memory input controller 4 (S239).

The aforesaid image input process is repeated as many times as the frame division number (S240). Note that the section of the image sensing area to be sensed as well as an area in the memory 5 used for storing image data are changed in each image input process.

When the image in the designated image sensing area has been entirely sensed by sections, the still image input process is completed (S241).

If another still image or moving image is to be inputted, the process is continued, whereas if not, the process is terminated (S242).

Next, referring to FIG. 24, when the still image inputted by performing the aforesaid operation is to be outputted, whether or not the still image is to be printed is determined (S251). If the still image is to be printed, then image data of a designated still image stored in the storage unit 8 is transmitted to the output unit 10 where the image is printed on paper (S252).

Next, whether or not the image is to be displayed is determined (S253), and if it is, image data of a designated still image stored in the storage unit 8 is transmitted to the display 9 where the image is displayed (S254). It should be noted that the image is displayed on a CRT and the like.

Next, whether or not the image is to be transmitted is determined (S255). If it is, then image data of a designated still image stored in the storage unit 8 is transmitted to the communication unit 11 where the image data is transmitted to a communication unit of destination (S256).

If there is another output request, the process is continued, whereas, if there is not, the process is terminated (S257).

In the aforesaid conventional apparatus, it is possible to input a high quality still image, and store, display, output, and/or transmit it.

However, if it is desired to partially make some addition, deletion, and/or exchange on the input still image, it is necessary to entirely input another high quality still image.

Further, since a still image which is similar to a previously input still image is newly inputted as described in the previous paragraph, the still image inputted previously and the still image being inputted currently are dealt with separately, with no recognized relationship between them.

In other words, although plural sets of information for the plural still image are almost same, it is necessary for a memory to have enough capacity to store the all sets of the information. Accordingly, a problem in increase storage requirement to store two or more almost identical still images exists.

In addition to storing the image data, in a case of transmitting the almost identical still images, all the image data is to be entirely transmitted, thus wasting transmission time.

SUMMARY OF THE INVENTION

The present invention has been made in consideration of the above situation, and has as its object to provide an image sensing apparatus and method capable of storing a large number of images in a memory having relatively small capacity by extracting areas which differ between similar images and storing the extracted areas instead of storing the entire images, when a plurality of images are to be stored.

According to the present invention, the foregoing object is attained by providing an image sensing apparatus comprising first input means for inputting an image in a predetermined image sensing area in a first resolution by said image sensing means, second input means for inputting images in the predetermined image sensing area in a second resolution which is lower than the first resolution by said image sensing means, determination means for determining a differing area by comparing two images inputted in the second resolution by said second input means, third input means for inputting an image which includes the differing area in a third resolution which is higher than the second resolution by said image sensing means, and control means for controlling so as to store information on the image inputted by said third input means in said storage means.

In accordance with the present invention as described above, by taking one still image of high resolution as a standard image, differing portions of subsequent images which are similar to the standard image can be sequentially stored, thereby reducing an amount of information to be stored.

It is another object of the present invention to provide an image sensing apparatus and method capable of storing a large number of images in a memory having relatively small capacity by obtaining areas which differ between similar images by performing image sensing process less number of times, and storing the obtained areas instead of storing the entire images, when a plurality of images are to be stored.

According to the present invention, the foregoing object is attained by providing an image sensing apparatus comprising designation means for designating one of a plurality of still images stored in said storage means, and output means for outputting a still image designated by said designation means, wherein said control means searches the still image designated by said designation means from said storage means, and converts the searched still image into a form to be outputted on the basis of attribution of the searched still image.

In accordance with the present invention as described above, it is possible to effectively sense an area which is detected to have a portion differing between images by designating image sensing area.

The invention is particularly advantageous since, when a plurality of still images of high resolution are to be stored, by storing information on areas which differ between images, required memory capacity for storing the plurality of still images can be reduced. At the same time, output process as well as communication process can be performed more effectively.

Further, by making the image sensing area changeable in accordance with an area, when difference exist between two images of the same area (referred as "differing area", hereinafter), the differing area can be inputted more effectively.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 15 is an example of a management table for managing updated images;

DETAILED DESCRIPTION OF THE PREFERRED EMBODIMENTS

Preferred embodiments of the present invention will be described in detail in accordance with the accompanying drawings.

<First Embodiment>

Figure 1:
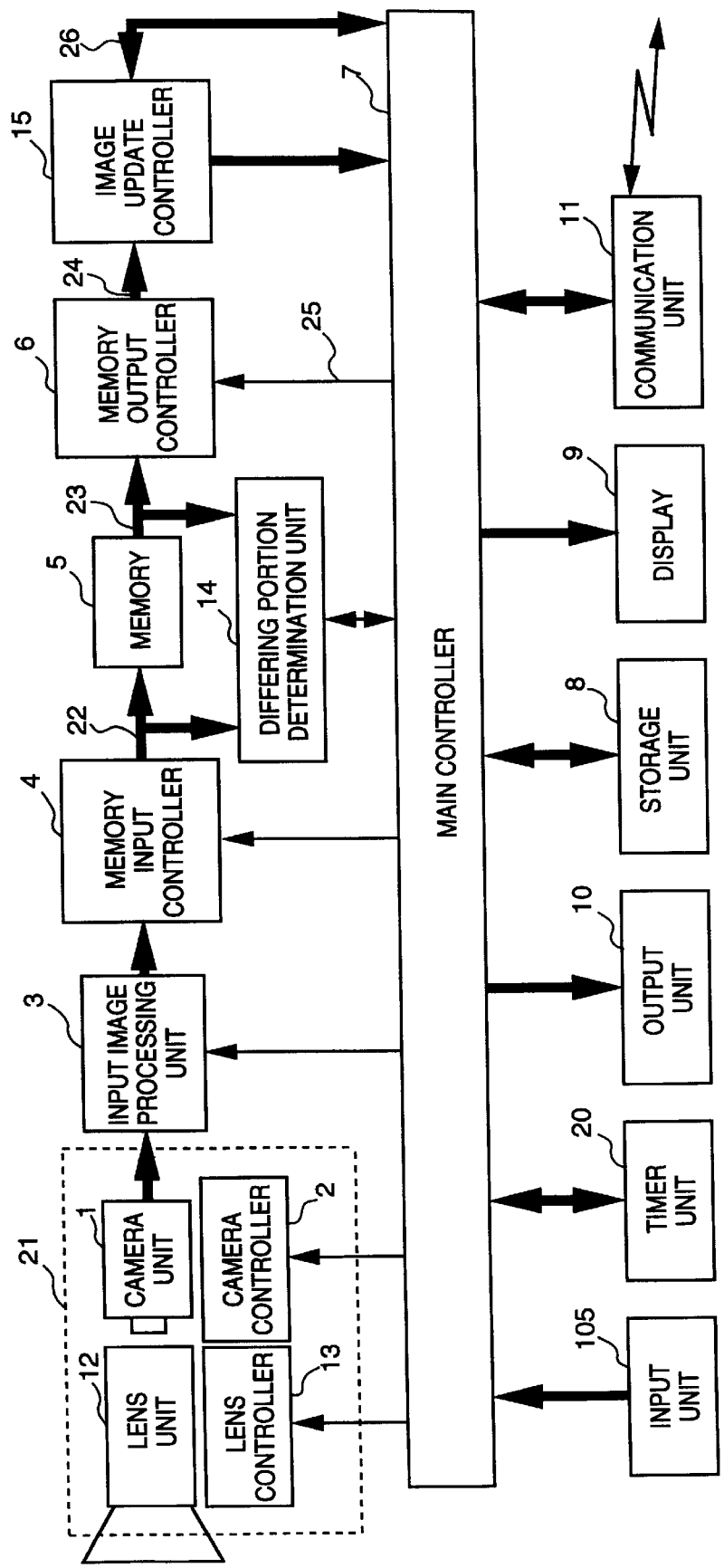
FIG. 1 is a block diagram illustrating a configuration of an image sensing apparatus according to a first embodiment.

FIG. 1 is a block diagram illustrating a configuration of an image sensing apparatus according to a first embodiment of the present invention.

Figure 22:
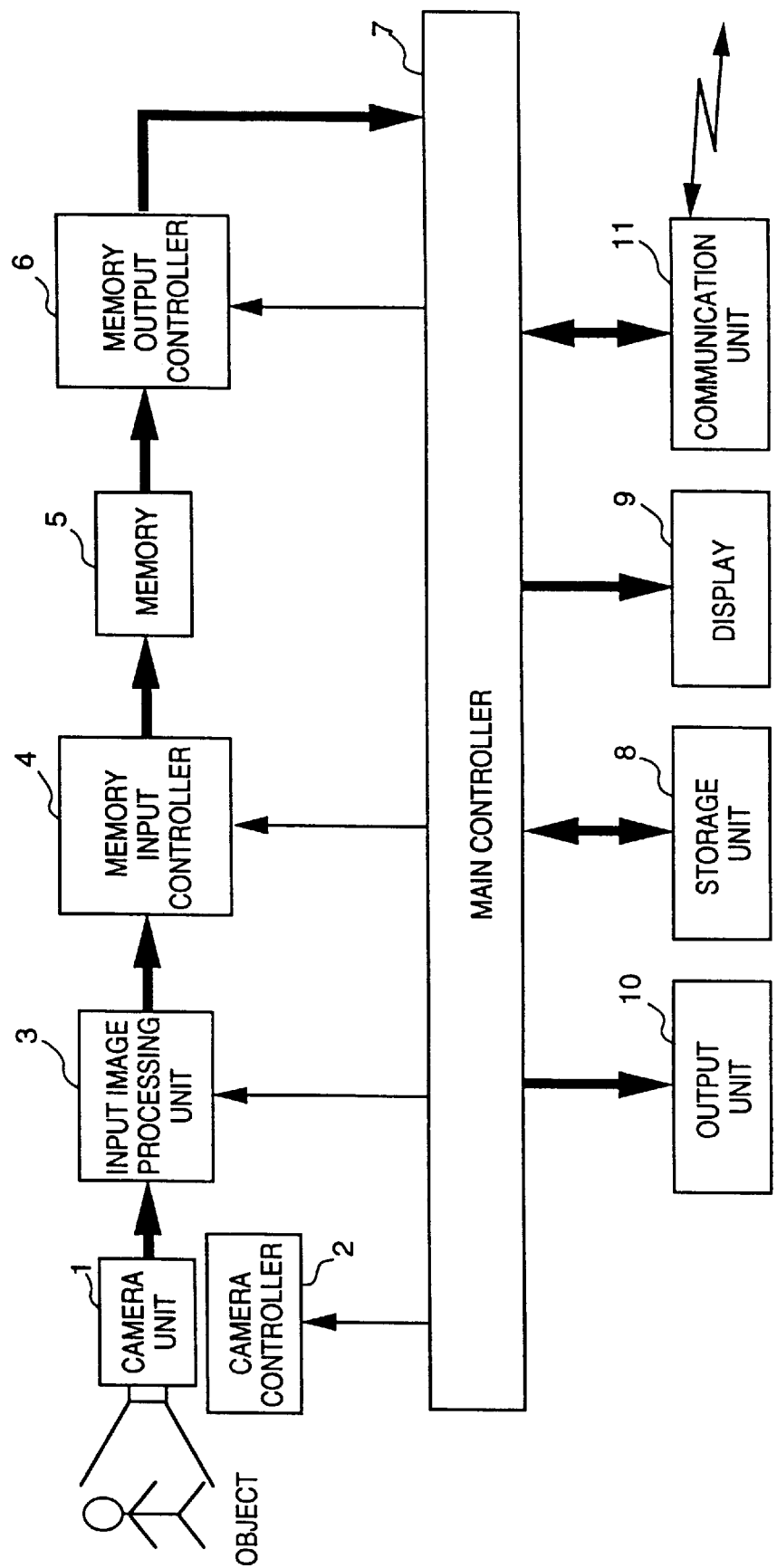
FIG. 22 is a block diagram illustrating a configuration of a conventional image sensing apparatus.
Figure 23:
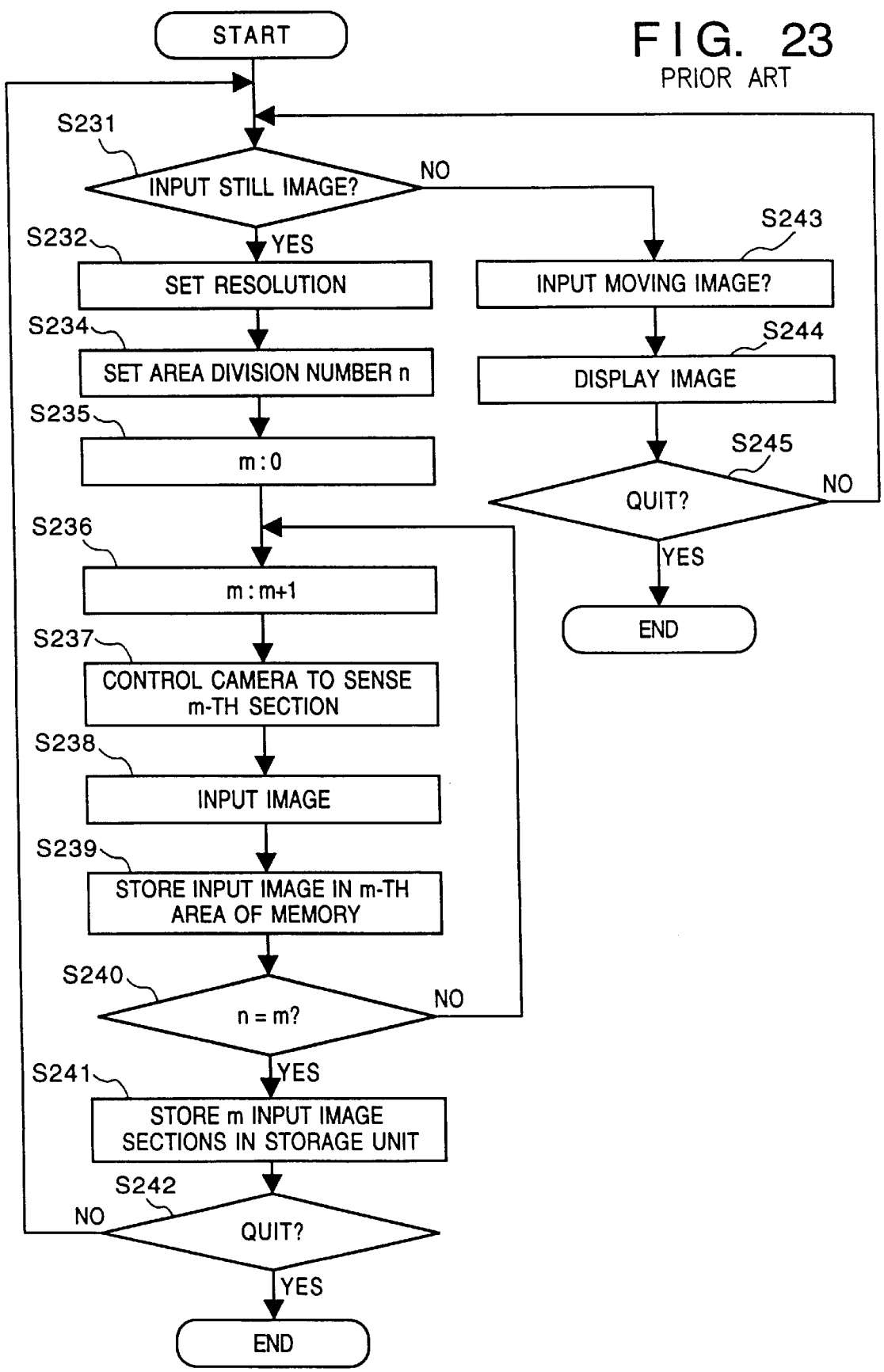
FIG. 23 is a flowchart showing conventional image inputting/storing process.
Figure 24:
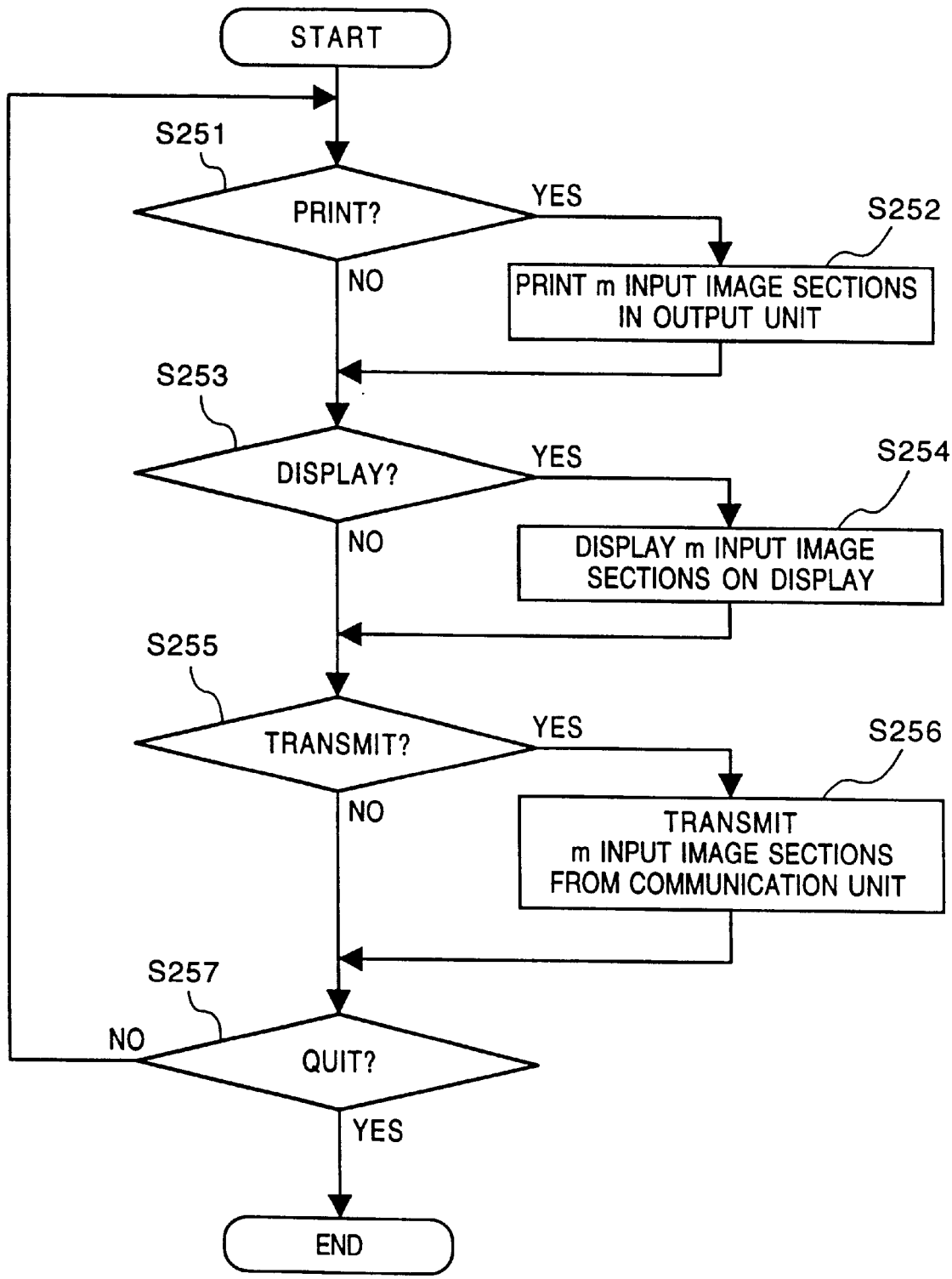
FIG. 24 is a flowchart showing conventional image outputting process.

In FIG. 1, the same units and elements as those in FIG. 22 are referred by the same reference numerals and explanations of those are omitted.

Units and elements, shown in FIG. 1, which are newly added to the conventional configuration will be explained below.

Reference numeral 12 is a lens unit capable of reducing an image sensing area by increasing a magnification rate by using a zooming function as well as capable of improving resolution of an image when sensing the image by slightly shifting a light path of each image element to a CCD so as to change image sensing area. Reference 13 is a lens controller for controlling magnification or reduction ratio of the lens unit 12 or shifted amount of the light path of each image element to the CCD in accordance with a designation from the main controller 7. In the first embodiment, a configuration consisting of the lens unit 12, the lens controller 13, the camera unit 1, and the camera controller 2 is referred as an image sensing unit 21.

Further, in FIG. 1, reference numeral 14 denotes a differing portion determination unit for determining differences, or motion, between an image frame which is previously inputted and an image frame which is currently sensing; and 15, an image update controller for controlling so as to replace a block of the image which was previously stored in the storage unit 8 with an image block of a newly input image which is determined that there is some differences from the previous block, where positions of these blocks correspond to each other.

Reference numeral 105 denotes an input unit from which a manual input operation is performed by a user; and 20, a timer unit for measuring time.

Further, reference numeral 22 denotes input image data outputted from the memory input controller 4, and inputted into the memory 5 and the differing portion determination unit 14; 23, image data outputted from the memory 5, and inputted into the memory output controller 6 and the differing portion determination unit 14; 24, image data outputted from the memory output controller 6 and inputted into the image update controller 15; 25, storage data outputted from the image update controller 15 and stored in the storage unit 8 via the main controller 7; 26, image data read from the storage unit 8 and replaced by the image data 24 at the image update controller 15 when necessary, then written into the storage unit 8.

Next, an operation of the aforesaid configuration will be described below in detail.

Figure 2A:
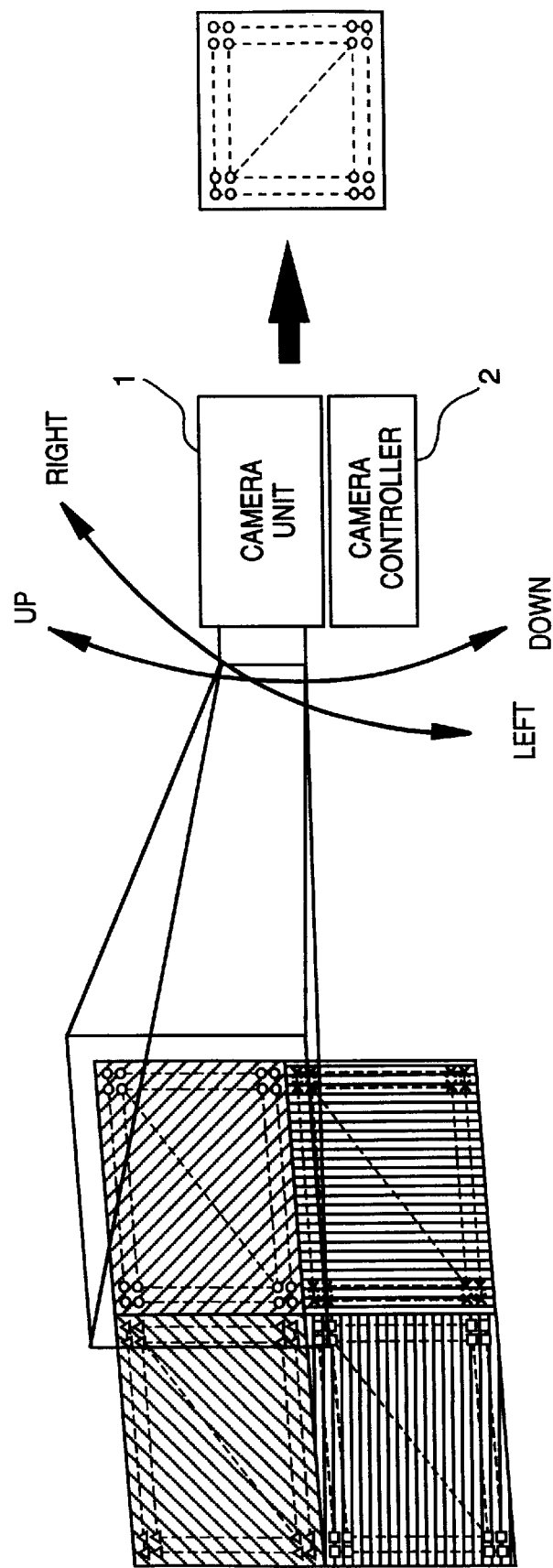
FIGS. 2A to 2C are explanatory views showing methods of sensing an image of high resolution.
Figure 2B:
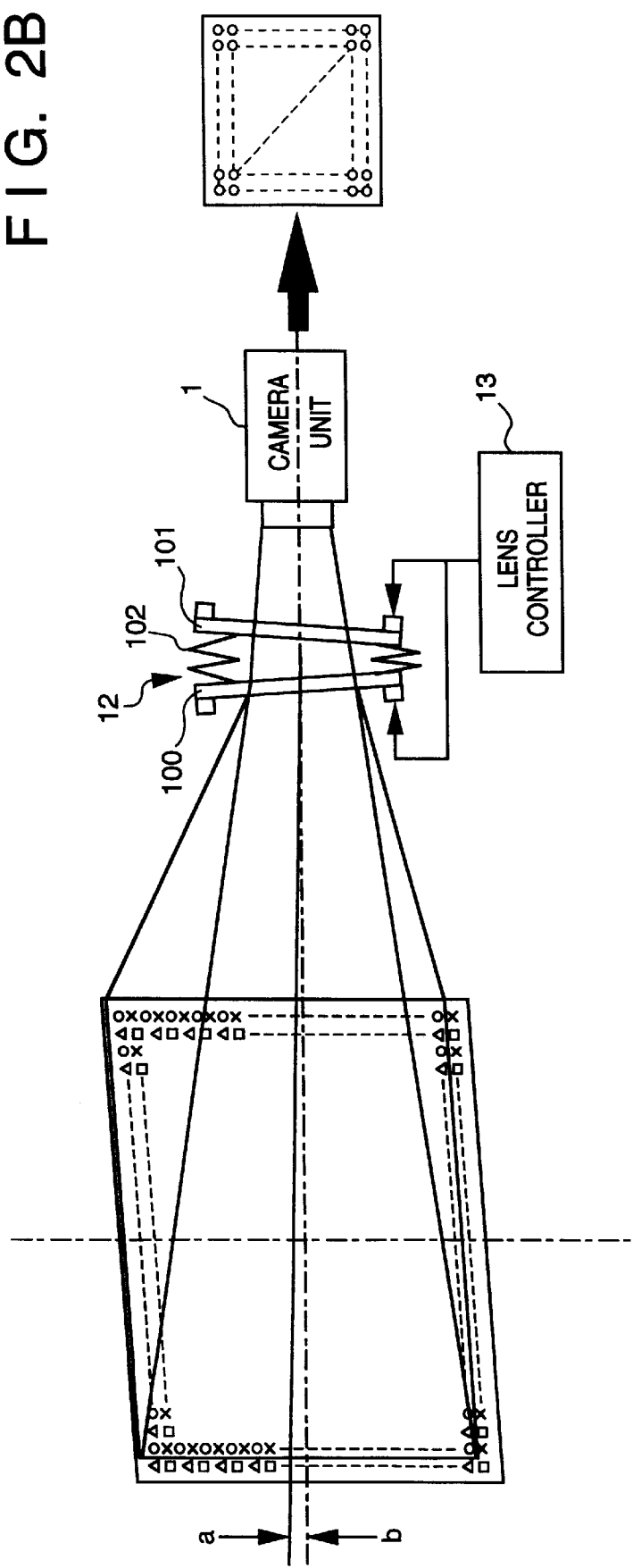
Figure 2C:
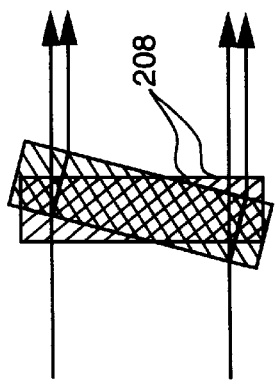

FIGS. 2A to 2C show three methods of inputting an image of high resolution, which can be performed according to the first embodiment. FIG. 2A illustrates an input method for inputting an image by divided image frame (referred as "divided frame input process", hereinafter). This method is performed in such a manner that image data is inputted by each divided area by moving an image sensing area of the camera unit 1 which is the image sensing means, up, down, to the right and left. In an example of FIG. 2A, a divided image sensing area (referred as "image sensing section", hereinafter) marked by small circles is inputted as image data.

Similarly, by moving the camera unit 1 up, down, to the right and left, images in respective image sensing sections marked by triangles, squares, and crosses are obtained. Thereafter, by combining the obtained image sections, an image of high resolution can be obtained.

This method can be performed by a conventional image sensing apparatus without any modification by controlling the image sensing area of the image sensing apparatus and performing image processes for combining a plurality of input image sections.

According to the divided frame input method, conventional image processing circuits and the like can be used for applying image processes to each input image section. Furthermore, regarding a control of an image sensing area, since an available driving motor is precise enough, the divided frame input method can be easily performed. However, regarding combining the input image sections, if the image sections are simply combined, an obtained image would look unnatural, since borders between the input image sections are not continuous and each of the image sections is sensed at different timings. Accordingly, more complex image processes are required for solving the above problem.

Next in FIG. 2B, another input method for inputting an image by shifting image sensing area of the image sensing unit on a pixel by pixel basis (referred as "pixel shifting input method", hereinafter). By slightly shifting an optical axis b of the lens unit 12 to an optical axis a, the image sensing area sensed by the camera unit 1 moves slightly. Similarly, by inputting an image at each time when the optical axis is slightly shifted, it is possible to achieve an effect that resolution is improved since the number of image sensing elements is increased, although the actual number of the image sensing elements of the camera unit 1 does not increased. FIG. 2B shows an example of extracting pixels marked by circles and inputting them as an input image section. Similarly, by slightly shifting the optical axis, respective images consisting of pixels marked by triangles, squares, and crosses are obtained, and by combining the obtained images, a single image of high resolution can be obtained.

Shifting the optical axis can be realized by making the vertical angle of a prism lens, for example, of the lens unit variable. Such a prism lens can be constructed by using two glass plates 100 and 101 and filling the space between the glass plates 100 and 101 with a liquid material 102 of silicon family, then sealing outside. A vertical angle can be altered by changing slopes of glass plates by the lens controller 13 which is constituted with an actuator.

According to the pixel shifting input method, it is possible to use an available image sensing apparatus, however an image processing method performed by the input image processing unit 3 has to be different from a conventional method. Further, a very high precision of controlling the lens unit is required in order to slightly change the optical axis so as to precisely sense an image in a desired image sensing area. As a result, a very complex control is necessary. However, regarding combining a plurality of input image sections, since there is no discrete border between the image sections, it is easy to combine them.

It should be noted that the reason why, in the pixel shifting input method, the image processes performed in the input image processing unit 3 should be different from conventional processes is that image data is inputted after sub-sampled, thus each input image section is not continuous in space, which is different from a case of the divided frame input method shown in FIG. 2A. In a conventional image process (e.g., an interpolation process by using filters) performed by the input image processing unit 3, it is assumed that image data is continuous in space. Therefore, if the conventional image process is directly performed on the image data inputted in accordance with the pixel shifting input method, quality of an image might drop. Therefore, in a case where the pixel shifting input method, shown in FIG. 2, is used, it is preferred that the image processes, performed in the input image processing unit 3, are applied after combining the plurality of input image sections.

However, a problem of discrete borders between the image sections, which is caused by using the divided frame input method, does not arise in an combined image obtained by using the pixel shifting method, thus the combined image does not suffer from unnatural feature.

Especially, continuous feature does not vanish even though resolution is changed, thus the pixel shifting input method is most suitable to input a high quality still image.

FIG. 2C illustrates another pixel shifting input method which uses a plane parallel plate. In this method, offset between the traveling directions of an incoming light and outgoing light to/from a material having a particular refractive index is used. More specifically, by sensing an image while slightly shifting a light path to the CCD by tilting the plane parallel plate, resolution and color reproduction quality of an image can be improved.

Figure 3:
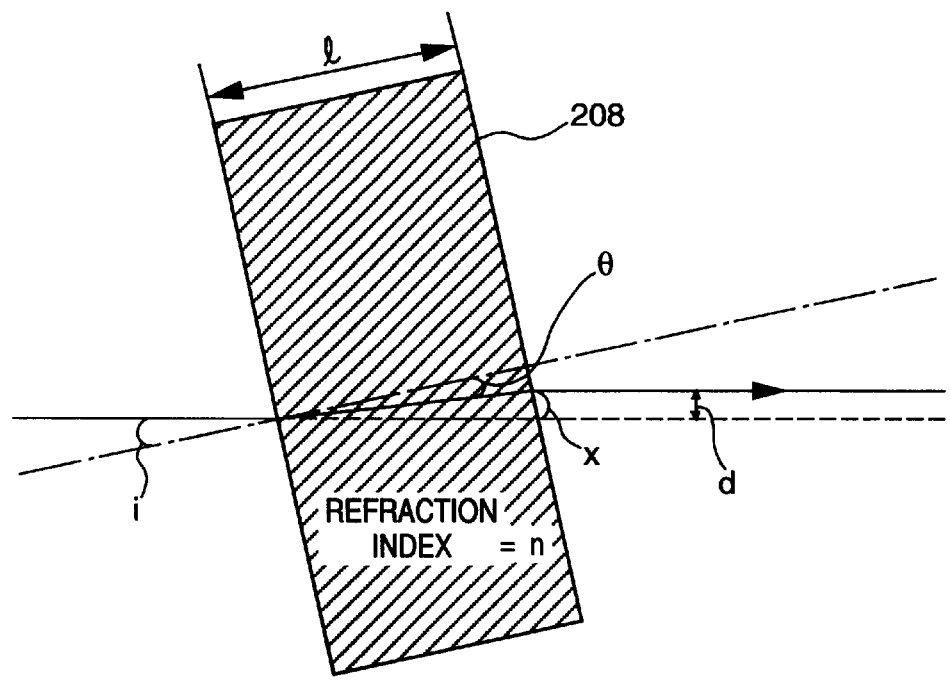
FIG. 3 is an explanatory view showing how light paths bent through a transparent board having a uniform thickness.

Referring to FIG. 3, how the light path to the CCD is shifted is explained.

The optical axis does not shift when transparent plate 208 is perpendicular to the optical axis. However, in general, if the direction of a light path is slant with respect to the plane parallel plate 208, the light path bents in accordance with an incidenting angle of light and a refractive index which is specific to the plane parallel plate. The refractive value is fixed with respect to a material of the plate and incidenting angle, and the shift of the light path becomes greater as the plate becomes thicker. Further, when the light leaves the plane parallel plate, the light path bents again, and the outgoing light path from the parallel plate becomes parallel to the incoming light path.

Therefore, a distance d, shown in FIG. 3, is the offset of the light path to the CCD. The distance d can be obtained from the following function.

$n = \sin i / \sin \theta$ (n: refractive index)

$x = 1 \cdot (\tan i - \tan \theta)$ $d = \cos i \cdot x$

Therefore, $d = \cos i \cdot 1 \cdot (\sin i / \cos i - \tan \theta) = 1 \cdot [\sin i - \cos i \cdot \tan \{\sin^{-1}(\sin i/n)\}]$ If the distance d is the same as an interval between pixels of image sensing elements, then an image which is shifted by one pixel is sensed, and if it is a half interval between pixels of image sensing elements, then an image which is shifted by half pixel is sensed.

Figure 4:
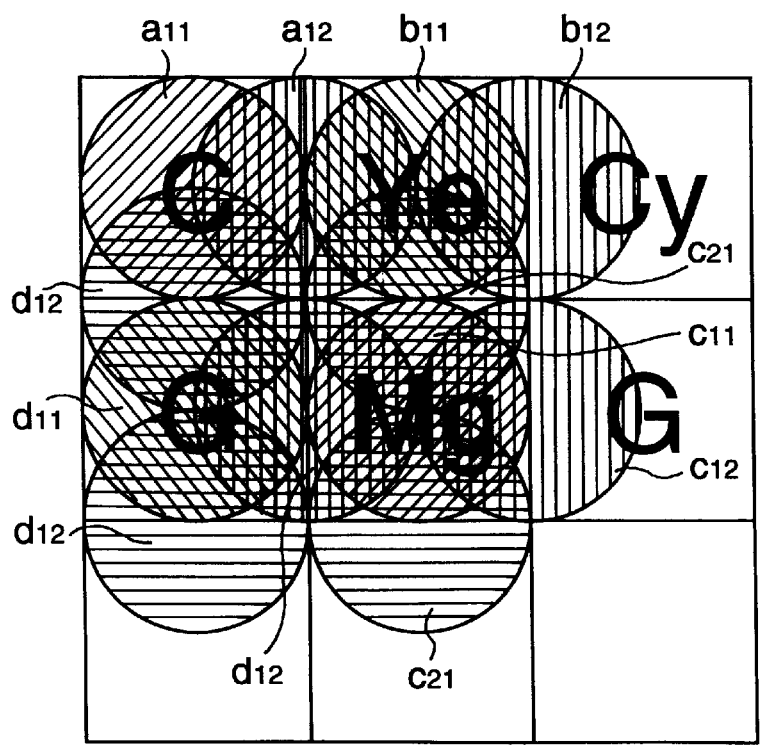
FIG. 4 is an explanatory view showing image sensing process by shifting image sensing area on a pixel by pixel basis.

FIG. 4 shows an operation to sense an image by performing the pixel shifting input method. Here, each square shows an image sensing element of one pixel. Referring to FIG. 4, each pixel is sensed at positions of a11 to d21 in accordance with the pixel shifting input method. Let a position at a11 be a reference position, then b11, c11, d11 are positions which are shifted from the reference position by one pixel by performing pixel shifting using the plane parallel plate. It should be noted that an image to be sensed is identical, and a11 is sensed as a cyan filtered image, b11, a yellow filtered image, c11, a magenta filtered image, and d11, a green filter image.

Further, when a position is shifted from the reference position in the horizontal direction by half pixel, let the shifted position (a12) be a new reference position, and the position is further shifted by one pixel from the new reference position, the pixels, b12, c12, and d12, which are shifted by half pixel are obtained.

Similarly, by sequentially sensing the image after shifting by one pixel or half pixel each time so as to sense a set of pixels a21, b21, c21, and d21, a set of pixels a22, b22, c22, and d22, and so on, for instance, a high quality still image can be inputted.

Figure 5:
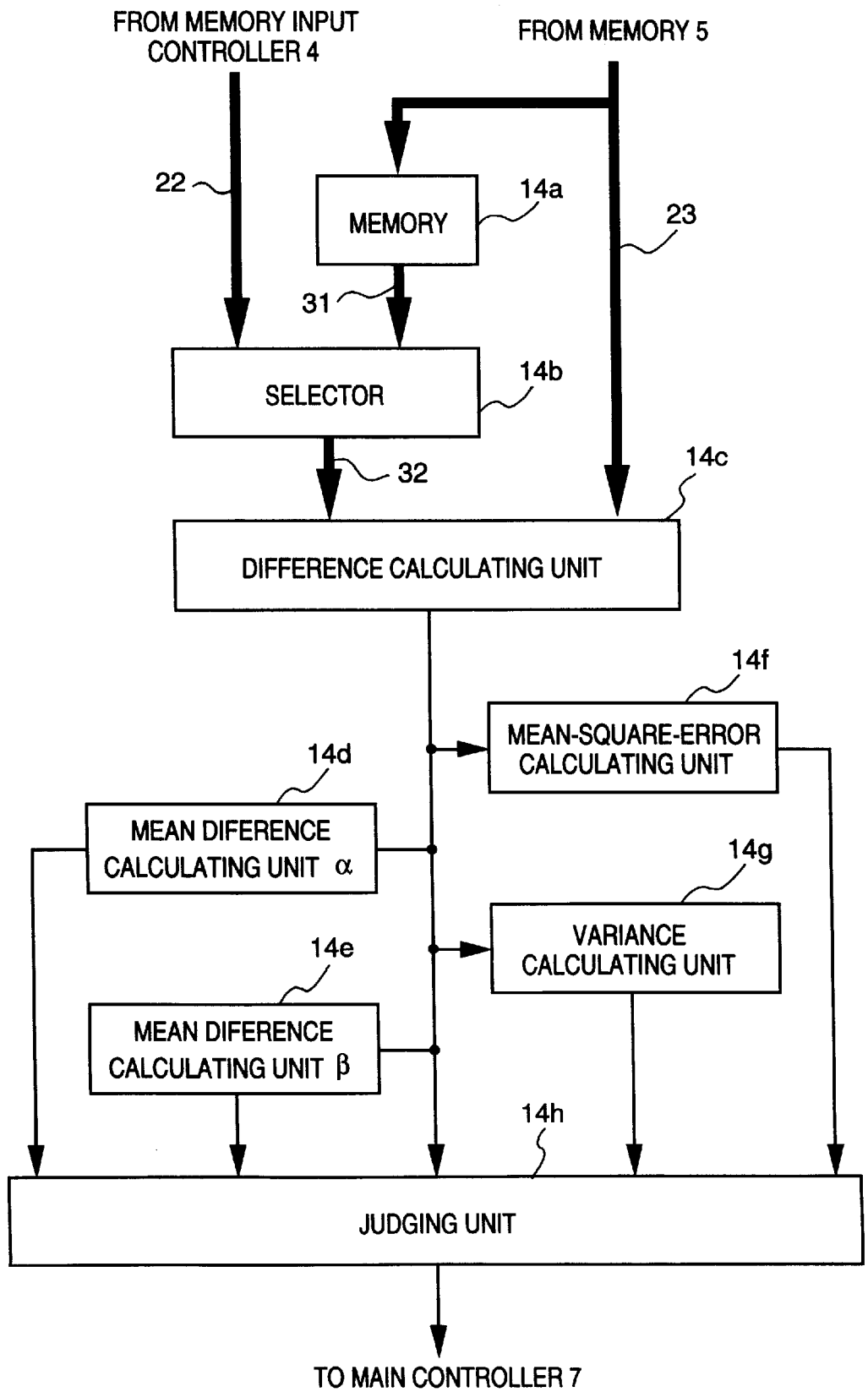
FIG. 5 is a block diagram illustrating a detailed configuration of a differing portion determination unit.

Next, referring to a block diagram in FIG. 5, a configuration of the differing position determination unit 14 will be explained. In FIG. 5, reference numeral 14a denotes a memory for temporary storing the image data 23 outputted from the memory 5; 14b, a selector for selecting either the image data 22 inputted from the memory input controller 4 to the memory 5 or output image data 31 stored in the memory 14a, and transmitting the selected data to a difference calculating unit 14c; and 14c, the difference calculating unit for calculating difference data between image data 32 selected at the selector 14b and the image data 23 outputted from the memory 5.

Further, reference numeral 14d denotes a mean difference calculating unit α; 14e, a mean difference calculating unit β;

14*f*, a mean-square-error calculating unit; 14*g*, a variance calculating unit; and 14*h*, a judging unit to which results of operations in each of the calculating units 14*c* to 14*g* are inputted, and for judging whether or not there is any change between images. Each of the calculating units 14*d* to 14*g* is explained below with reference to FIGS. 6A and 6B.

Figure 6A:
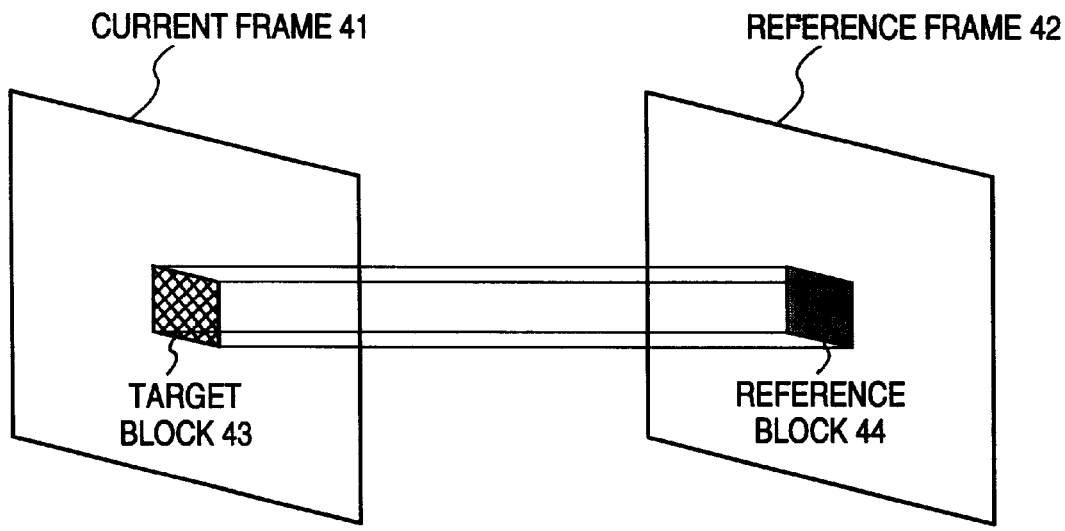
FIG. 6A and 6B are explanatory views showing a method of detecting differing portions between images.
Figure 6B:
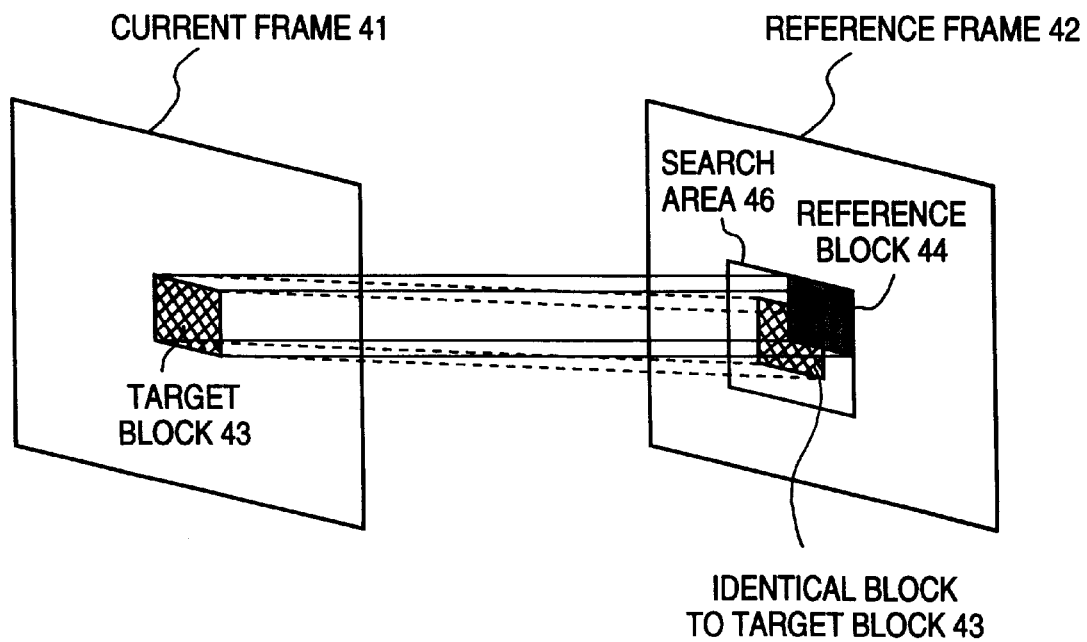

FIGS. 6A and 6B are explanatory Views showing brief process in the differing portion determination unit 14 according to the first embodiment. FIG. 6A is for difference calculation, and FIG. 6B is for motion vector calculation. In FIG. 6A, reference numeral 41 denotes a current frame for image data inputted from the memory input controller 4; and 42, a reference frame for image data which has been stored in the memory 5. The current frame 41 and the reference frame 42 have the same size, and can be expressed in the same coordinate space. Further, reference numeral 43 in the current frame 41 denotes a target block which is checked whether or not there is any differing portion; and 44 in the reference frame 42, a reference block. These blocks are in the same position and have the same size. Further, in FIG. 6B, the current frame 41, the reference frame 42, and the target block 43 are same as those in FIG. 6A, and the reference numeral 46 in the reference frame 42 denotes a search area; and 45, a reference block. The search area 46 includes an area corresponding to the target block 43, and is larger than the target block 43. By embedding the reference block 45 in the search area 46 arbitrarily, a motion vector is detected.

More specifically, the mean difference calculation unit α 14*d* calculates a mean difference between all the corresponding pixels in the target block 43 in the current frame 41 and in the reference block 44 in the reference frame 42 which are shown in FIG. 6A. Further, the mean difference calculation unit β 14*e* calculates a mean difference between all the corresponding pixels in a target block 43 in the current frame 41 and in the reference block 45 in the search area 46 in the reference frame 42 which are shown in FIG. 6B. Furthermore, the mean-square-error calculating unit 14*f* calculates a mean-square-error between all the corresponding pixels in a target block 43 in the current frame 41 and in the reference block 45 inside the search area 46 in the reference frame 42 which are shown in FIG. 6B. Furthermore, the variance calculating unit 14*g* calculates a variance in the target block 43 in the current frame 41 is calculated.

It should be noted that the target block 43 is a unit of image to which image process is applied. Generally, as a smallest unit, a set of pixels of each of the RGB signals which are color information, four pixels for each of the YUV signals, or four pixels for a Y signal and two pixels for each of the UV signals are used. Further, a plurality of aforesaid smallest units sometimes makes a block.

In the first embodiment, differences between corresponding pixels placed at the same coordinates in the target block 43 and in the reference block 44 is calculated, and a mean difference of the calculated differences between all the corresponding pixels inside of those blocks is obtained, thereby obtaining a difference between those blocs.

With regard to the reference frame 42, the search area 46 for obtaining a moving vector is set. Inside of the search area 46, when an object moved, the movement of the object can be detected as well as a moving vector can be calculated.

Namely, inside all the search area 46, differences between corresponding pixels in the target block 43 and in the reference block 45 are calculated by taking the reference block 45 as a processing unit.

For example, if the reference block 45 has a size of 4 pixels (2 pixels×2 pixels) and the search area has a size of 16 pixels (4 pixels×4 pixels), then there are 9 patterns of combinations between the corresponding block 43 and possible positions of the reference block 45 in the search area 46. It is necessary to calculate differences in all the combinations, thus requiring a large amount of operations.

On the basis of the calculated differences, a motion vector is calculated. More specifically, a magnitude of a vector between the target block 43 and the reference block 45, where the combination of the two blocks produces the minimum difference, corresponds the magnitude of a moving vector of a moving object.

Each calculation unit shown in FIG. 5 will be described below in detail on the basis of the brief description of the calculation processes described above.

First, referring to FIG. 6A, the mean difference calculating unit α 14*d* calculates a mean of differences between all the corresponding pixels in the reference block 44 in the reference frame 42 and in the target block 43 in the current frame 41. Letting a pixel value inside of the target block 43 be A(x, y), a pixel value inside of the reference block 44 be B(x, y), and the number of pixels in each block be M, a function to be used is described below.

$$\Sigma(A(x, y) - B(x, y))/M \qquad \text{Equation (1)}$$

With the equation (1), since it is possible to obtain a difference between corresponding pixels which are at the same position in the current frame 41 and in the reference frame 42, it is possible to obtain overall change in a predetermined time interval.

Referring to FIG. 6B, the mean difference calculating unit β 14*e* calculates a mean of differences between all the corresponding pixels in the reference block 45 in the reference frame 42 and in the target block 43 in the current frame 41. Letting a pixel value in the target block 45 be C(x, y), then a function for obtaining the mean can be described as below.

$$\Sigma(A(x, y) - C(x, y))/M \qquad \text{Equation (2)}$$

With the equation (2), it is possible to calculate which reference block 45 placed inside the search area 46 in the reference frame 42 is moved to be the target block 43 in the current frame 41. Thereby, it is possible to obtain a magnitude of movement of an object in a predetermined time period.

Referring to FIG. 6B, the mean-square-error calculating unit 14*f* calculates a mean-square-error of differences between all the corresponding pixels in the reference block 45 in the reference frame 42 and in the target block 43 in the current frame 41., An equation used for the calculation is as follow.

$$\Sigma(A(x, y) - C(x, y))^2/M \qquad \text{Equation (3)}$$

With the equation (3), since an absolute value of a difference between corresponding pixels at the same position in the current frame 41 and in the reference frame 42 can be obtained, it is possible to calculate overall change amount in a predetermined time interval.

The variance calculating unit 14*g* calculates a variance in the target block 43, and, letting a mean of pixel values in the target block 43 be "$\overline{A}$", then the equation is as follow.

$$\Sigma(A(x, y) - \overline{A})^2/M \qquad \text{Equation (4)}$$

where $\overline{A} = \Sigma(A(x, y))/M$

By using the equation (4), a variance of the target block 43 in the current frame 41 with respect to the mean of data values is obtained, thereby characteristics of an image section in the area can be known.

In the determination processing unit 14h, since how the images in the reference frame and in the current frame are different can be known from results of the equations (1) and (3), for example. Accordingly, when the values of the results are larger than predetermined values, it is possible to judge that there are differences between the images.

Further, it is possible to know whether or not there is any movement in the target block 43, or an amount of motion can be known from a result of the equation (2), thereby motion of an object can be judged.

Figure 7:
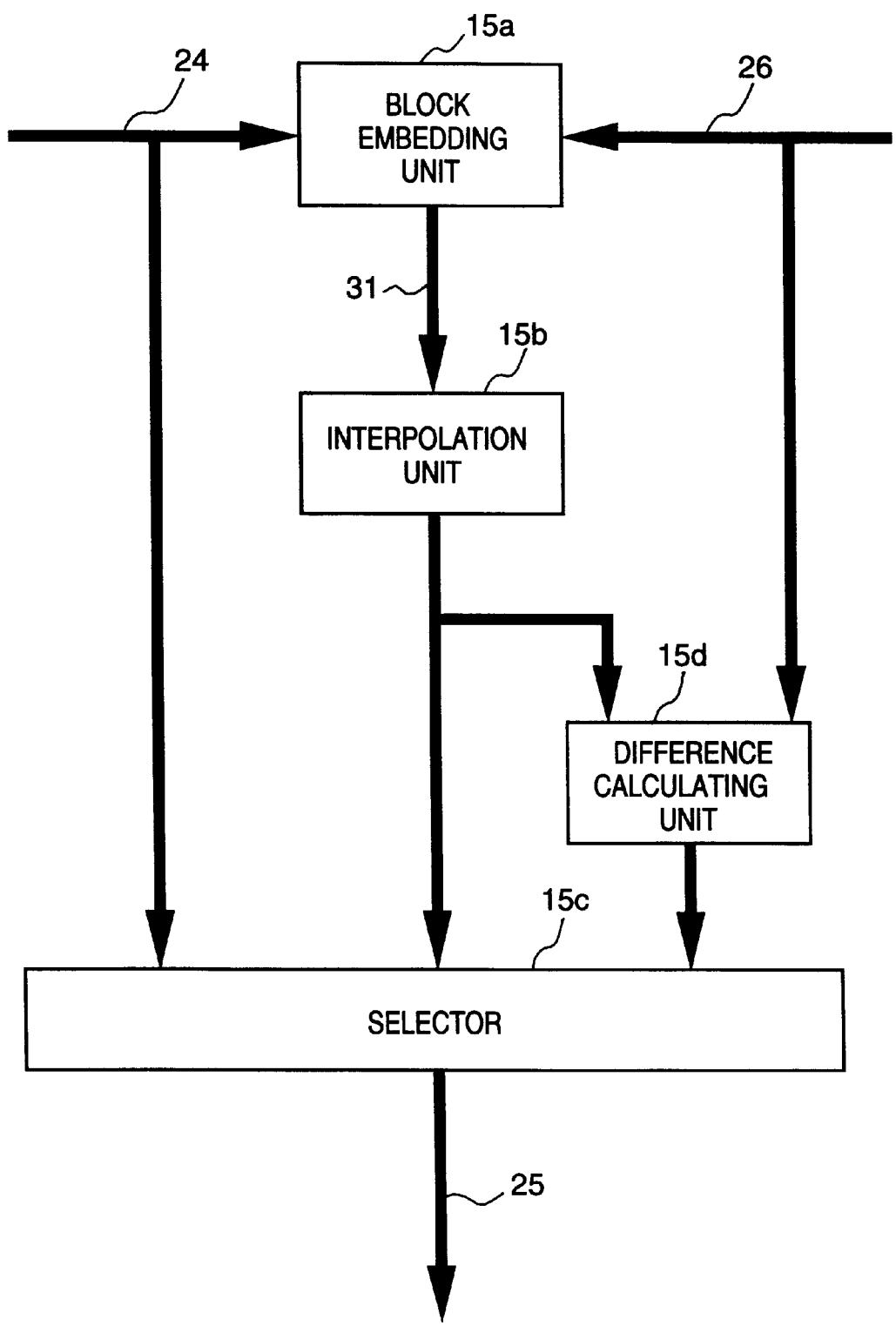
FIG. 7 is a block diagram illustrating a detailed configuration of an image update controller.

Next, referring to a block diagram of FIG. 7, a detailed configuration of the image update controller 15 is explained.

In FIG. 7, reference numeral 15a denotes a block embedding unit for embedding the image data 24 from the memory output controller 6 into the image data 26 stored in the storage unit 8; 15b, an interpolation unit for interpolating image data 31 from the block embedding unit 15a; 15d, a difference calculating unit for calculating a difference between the image data 26 stored in the storage unit 8 and image data outputted from the interpolation unit 15b; and 15c, a selector for selecting data out of the image data 24 from the memory output controller 6, the image data from the interpolation unit 15b, and difference data from the difference calculating unit 15d, and outputting the selected data as the storage data 25 to be stored in the storage unit 8.

Figure 8:
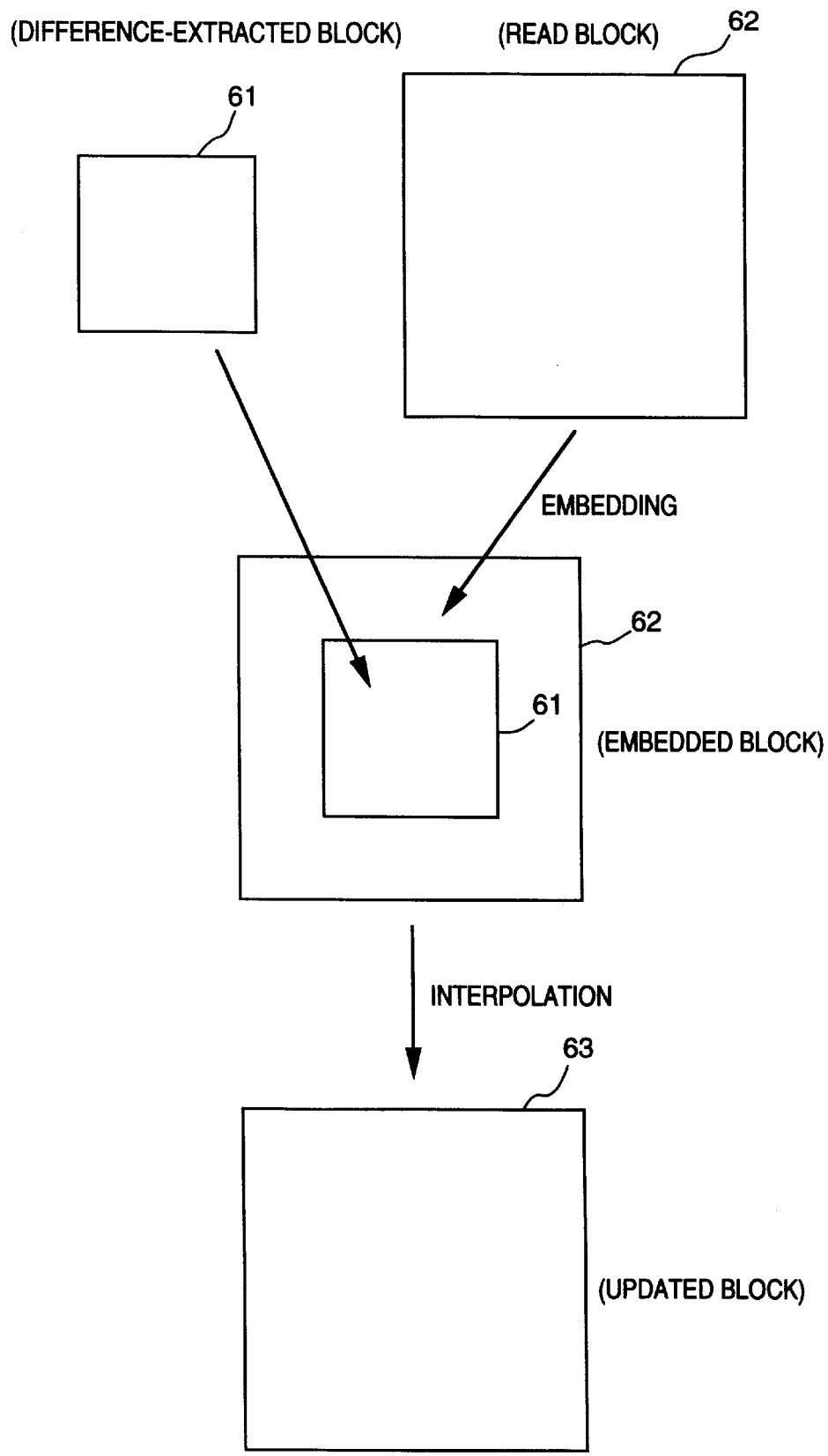
FIG. 8 is an explanatory view showing updating process by embedding an image section.

Next, referring to FIG. 8, embedding process and interpolation performed in the image update controller 15 will be described. In FIG. 8, reference numeral 61 denotes a difference-extracted block which corresponds to the image data 24 extracted and outputted from the differing portion determination unit 14, and reference numeral 62 denotes a read block which corresponds to the data 26 read from the storage unit 8. The read block 62 is obtained in such a manner that a portion corresponding to the difference-extracted block 61 and its vicinity of arbitrary width in the image data stored in the storage unit 8 are read. Then, in the block embedding unit 15a, the difference-extracted block 61 is embedded in an corresponding area inside of the read block 62. After embedding the difference-extracted block 61, the embedded block is interpolated in the interpolation unit 15b.

The interpolation is performed so that a border between the block 61 and the read block does not look unnatural or discrete. Specifically, correction in brightness, smoothing at border, and filtering process etc. are performed. When performing interpolation, it is possible to make use of characteristics of an image section on the basis of the variance obtained by using the equation (4). The image block which is interpolated as above can be managed individually in time sequence, and stored. Alternatively, it is overwritten in the area of the read block 62 in the storage unit 8 as an updated block 63. It should be noted that a detailed process in the updated block 63 will be described later.

Now, referring to FIG. 9, a brief still image inputting/storing process will be described below.

First at step S101, a high resolution still image which is to be a reference image is inputted by one of the three aforesaid methods of inputting a high resolution image. The input still image is stored in the storage unit 8 at step S102.

Next, a whole image of low resolution is inputted by zooming out by using the lens unit 12 at step S103. Then, after a predetermined time has passed, another whole image of low resolution is inputted. Thereafter, two whole images, inputted at step S103, are compared and differences between them are determined at step S104. Thereafter, the process proceeds to step S105, and if any difference is detected, then an area where any difference is detected is specified at step S106, and the area containing any difference is zoomed in at step S107, sensed at high resolution, and inputted as an image section.

At step S108, an area, corresponding to the image section inputted at step S107, in the image inputted at step S101 is updated with the image section inputted at step S107, then new image information is stored in the storage unit 8 at step S109.

Whereas, if there is no difference between two input images are detected at step S105, the process returns to step S103 where the next whole image is inputted.

According to the first embodiment as descried above, when a still image whose portion differs from a reference still image is to be stored, the portion which is necessary to be updated is to be stored. Therefore, amount of data to be stored is reduced.

The still image inputting/storing process shown in FIG. 9 will be further described below in detail with reference to flowcharts shown in FIGS. 10 to 12. It should be noted that the process shown in these flowcharts is stored as a control program in a ROM or the like in the main controller 7.

Figure 10:
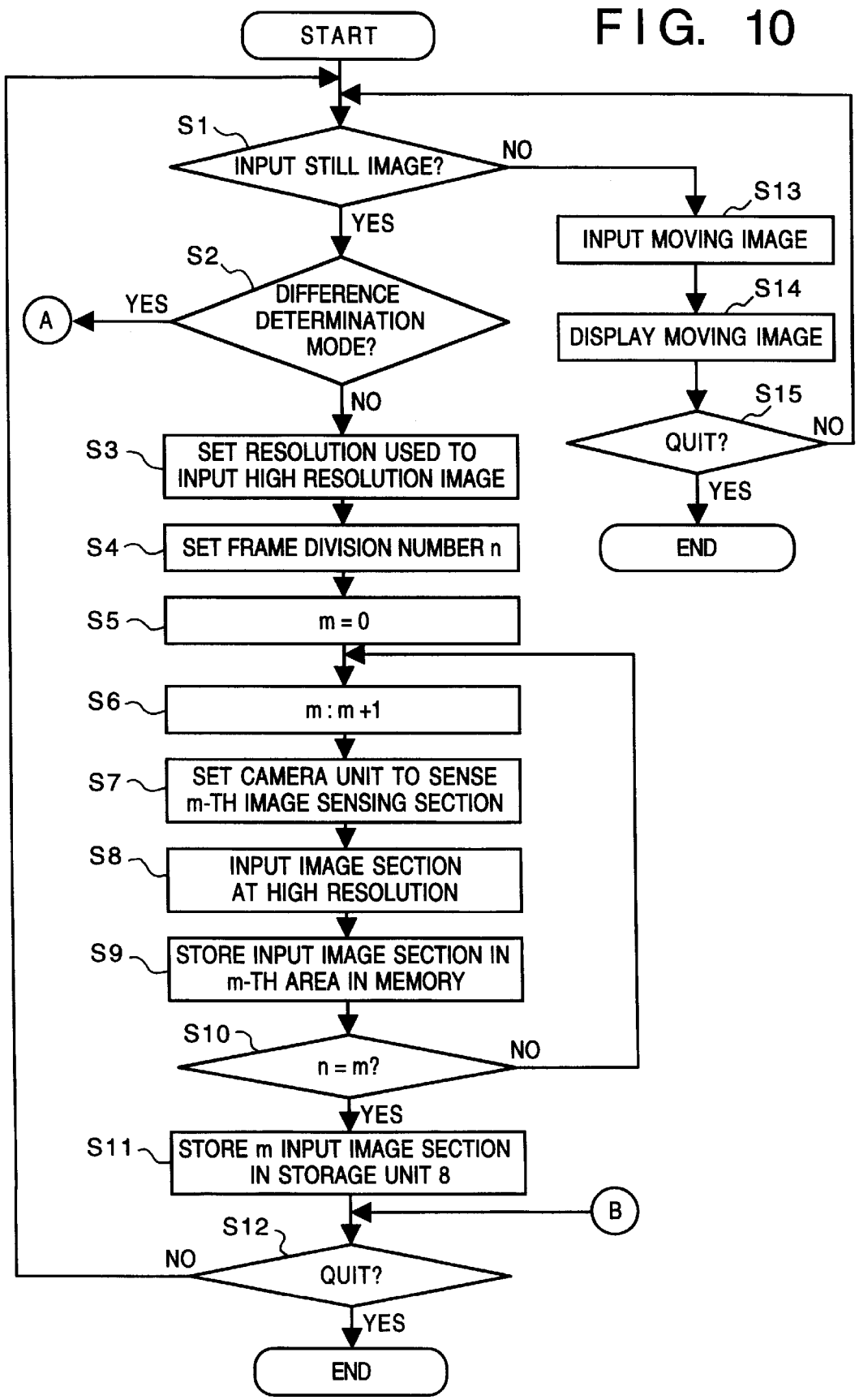
FIG. 10 is a flowchart showing detailed image inputting/storing process according to the first embodiment.

First at step S1 in FIG. 10, the main controller 7 determines whether or not to input a still image. If a still image is not inputted, then a moving image is inputted from the image sensing unit 21 (S13) and transmits it to the display 9 to display it (S14). Note that whether or not to input a still image is set by the input unit 105 in advance.

When a still image is to be inputted, the process proceeds to step S2 where whether or not a difference determination mode is set is determined. The difference determination mode is for detecting differences by performing image comparison described at step S104 in FIG. 9. Therefore, a case where the difference determination mode is not set is for inputting a first still image which is to be a reference image. Accordingly, if the difference determination mode is not set at step S2, the process moves to step S3 where process to input a high resolution image begins.

In the first embodiment, a flow of the process when the input method to input an image by section, a divided portion of a frame, is used as a method of inputting a high resolution image out of the aforesaid three methods will be explained. First at step S3, resolution used to input a high resolution image is set from the input unit 105, then the number of areas to which a frame is to be divided (frame division number) is set at step S4.

Next at steps S5 to S9, the position of the camera unit 1 is set to sense the first section, which is controlled by the camera controller 2, then image data is inputted and stored in the memory 5. This process is repeated as many times as the frame division number. Note that when image data is stored in the memory 5, a memory area is designated so that data of a plurality of input images do not overlay each other.

Thereafter, the process proceeds to step S10. When all the sections of the image frame have been sensed, the process moves to step S11 where all the sensed image data is stored in the storage unit 8. Then, the process returns to step S1 where either a moving image mode or still image mode is selected.

Figure 9:
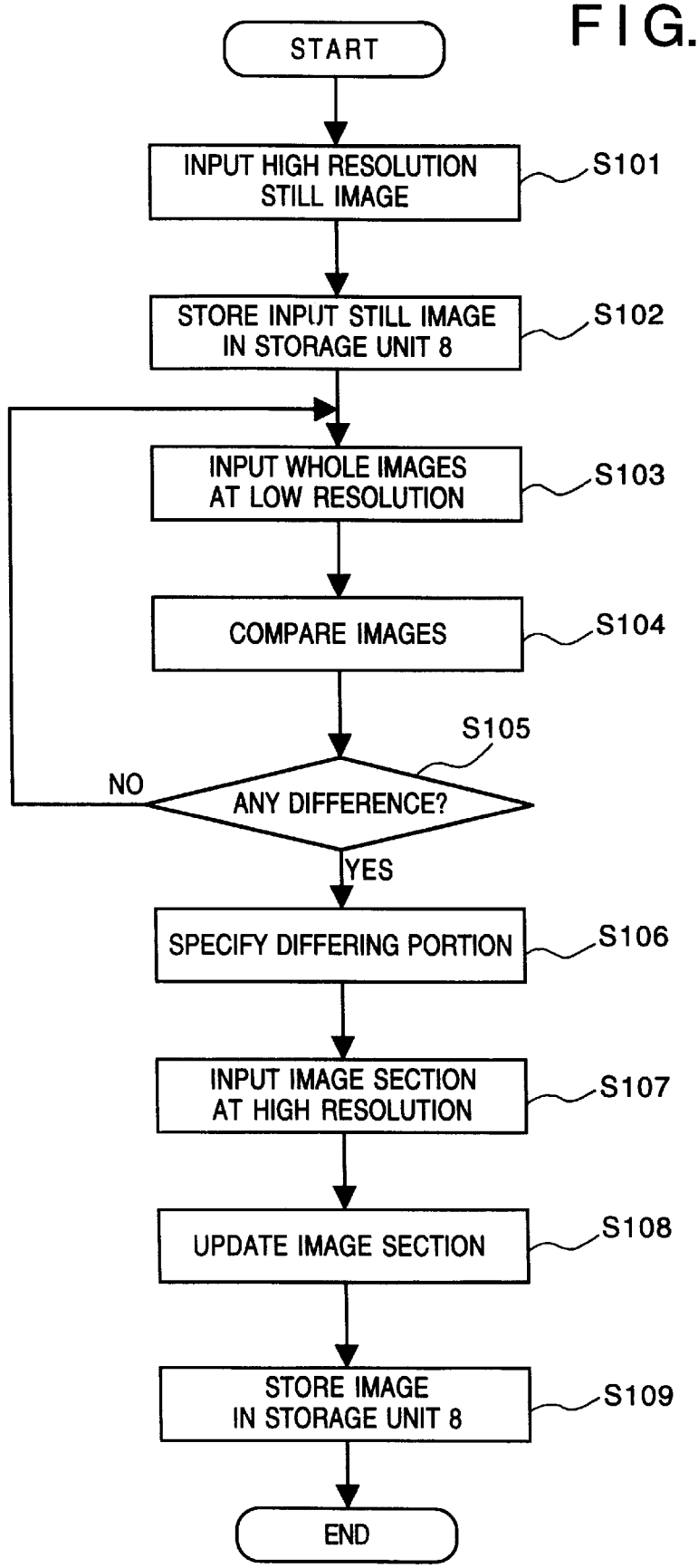
FIG. 9 is a flowchart briefly showing image inputting/storing process according to the first embodiment.

The process performed at the above-described steps S3 to S11 in FIG. 10 corresponds to the high quality still image inputting/storing process performed at steps S101 and S102 in FIG. 9.

Figure 11:
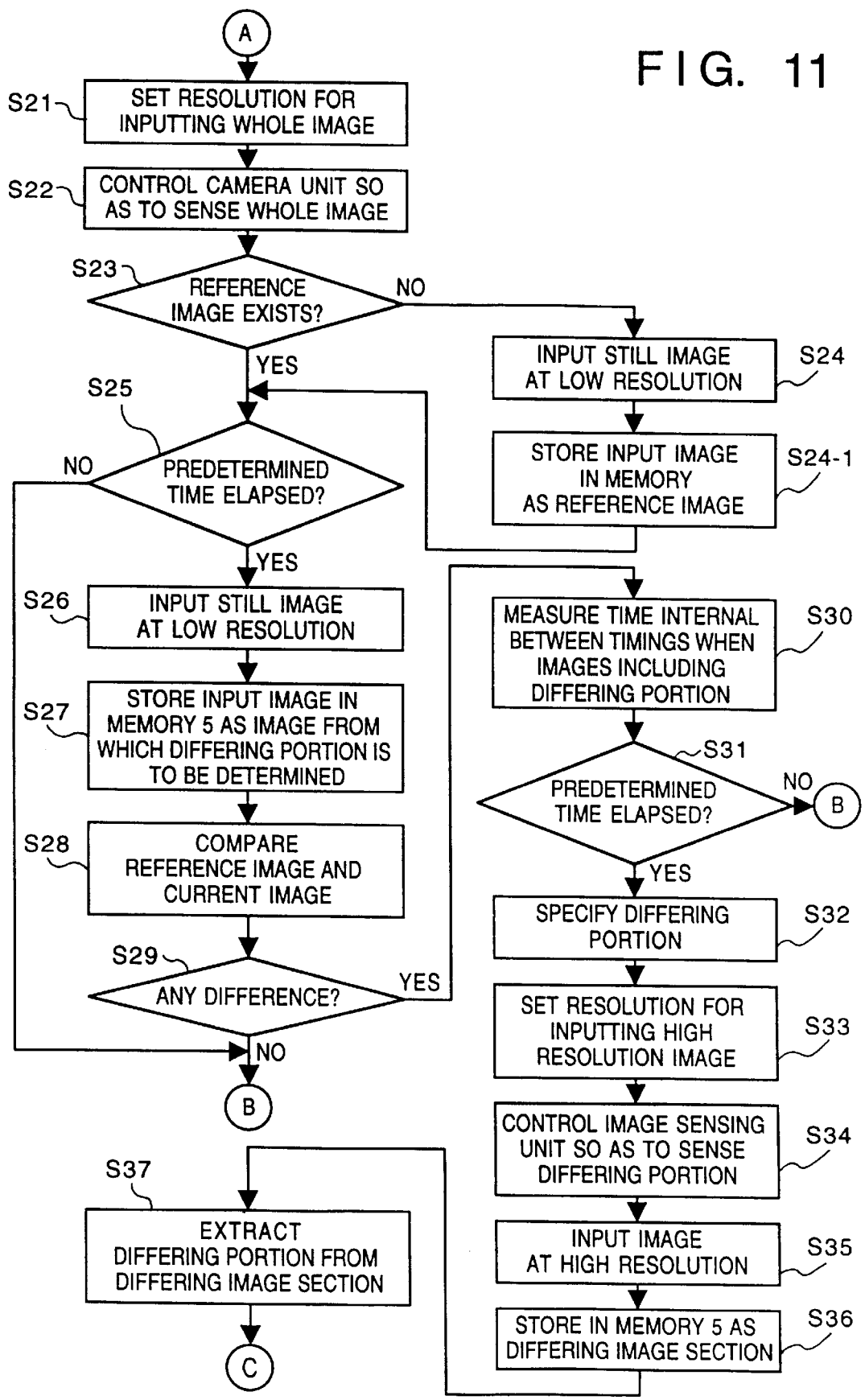
FIG. 11 is a flowchart showing detailed image inputting/storing process according to the first embodiment.

Further, when it is determined that the difference determination mode is selected at step S2, then the process moves to step S21 in FIG. 11, where a process to input a whole image by zooming out, explained at step S103 in FIG. 9, starts. First at step S21, resolution for inputting a whole image is set. Here, in order to set the resolution for inputting the whole image which was divided into sections and inputted by section at high resolution, a value which is obtained by dividing the resolution, used for inputting the mage at high resolution, by the frame division number which is set at step S4 is set as new resolution.

After the resolution is set as described above, the process proceeds to step S22 where the camera controller 2 control the camera unit 1 so that the center of the image sensing area of the camera unit 1 matches the center of an image to be sensed. Further, the lens controller 13 controls the zooming function of the lens unit 12 so that the image to be sensed, namely a whole still image, fits the image sensing area of the camera unit 1.

After preparation for inputting the whole still image is ready, next at step S23, it is determined whether or not there is a reference image in the memory 5, which had been sensed and is to be referred when detecting differences. If there is no reference image, then the process moves to step S24 where a process to input a reference image starts.

At step S24, a still image is sensed under the aforesaid settings, and at step S24-1, image data of the sensed still image is stored in a predetermined memory area, assigned for a reference image, in the memory 5.

Then, a process for determining a difference starts. In the first embodiment, still images are to be periodically inputted at an arbitrary time interval, thus the determination whether or not there are any difference between images is to be performed at an arbitrary time interval. Therefore, at step S25, whether or not a predetermined time interval has passed is determined by referring to the timer unit 20. If the predetermined time has not elapsed, then the process moves back to step 12.

Whereas, if it is determined that the predetermined time has elapsed, then the process proceeds to step S26 where the entire image is inputted at low resolution. The inputted image is transmitted to the differing portion determination unit 14 as well as stored in the memory 5 at step S27.

The above-described process at steps S21 to S27 in FIG. 11 corresponds a process of inputting an entire image at step S103 in FIG. 9.

Next at step S28, the differing portion determination unit 14 compares the reference image and a current image. To the differing portion determination unit 14, the image data 23 outputted from the memory 5 is inputted as the reference image, and the image data 22 inputted from the memory input controller 4 is inputted as the current image. At this time, the selector 14b selects the current image. Then, the process moves to step S29 where, whether or not there is any difference in the current image with respect to the reference image is determined by the determination processing unit 14h on the basis of the results of the difference calculating unit 14c and the like.

As a result of the judgment by the determination processing unit 14h, if it is determined that there is no differences between the current image and the reference image, the process returns to step S12, whereas if there is a difference, the process proceeds to step S30 where a process to find a position of differing area starts.

The above-described steps S28 and S29 in FIG. 11 corresponds to image comparison process of steps S104 and S105 in FIG. 9.

Then, at step S30, a time interval between the current image which includes a portion which differs from the reference image and a previous image including a differing portion is obtained by using the timer unit 20, and whether or not the obtained time interval is longer than a predetermined time interval is determined at step S31. If it is determined that a predetermined time had been elapsed, then the process proceeds to step S32 where a recognition process of the differing area is performed. Accordingly, in contrast with step S25 where the judgment is performed on the basis of a time interval between timings when each of two images is inputted, it is possible to perform the judgment on the basis of the time interval between timings when the current image which includes a differing portion is inputted and when the previous image including a differing portion is inputted, at step S30. Thereby, more flexible control can be realized.

It should be noted that, as a method of recognizing a differing portion, following two methods are available according to the first embodiment. One method is to judge a differing portion completely by the determination processing unit 14h on the basis a mean difference value, a mean-square-error, and a variance calculated at real time by using each of the calculating units 14c to 14g. Another method is to briefly judge whether or not there is any differing portion by calculating only a difference value by the difference calculating unit 14c at real time, then judge a differing portion in detail by using each of the calculating units 14c to 14g.

In the former method, since a precise differing portion can be determined at real time, the differing portion detection time is short, therefore, a high speed operational unit is required to realize the image processing at real time.

In contrast, in the latter method, whether or not there is a differing portion is determined at real time by calculating only a difference, thus amount of operation to be processed for image processing is small.

Then, in a case where a change is detected as a result of a judgment, a portion of the current image data, stored in the memory 5, corresponding to a differing portion is read from the memory 5 and stored in the memory 14a. Thereafter, a reference image stored in the memory 5 is read, and a difference between the current image stored in the memory 14a and the reference image is calculated by the difference calculating unit 14c. Further, a mean difference value, an error, a variance, and the like are calculated, and the determination processing unit 14h performs judgment on the basis of the calculated values. Therefore, although the judgment is not performed at real time, it is possible to perform effective judging process.

After a position of the differing portion is recognized at step S32 by using either one of the aforesaid two methods of recognizing a differing portion, resolution for inputting an image at high resolution is set at step S33. Namely, the current resolution is changed to the same resolution as what is set for inputting image sections by divided section of a frame at step S3. Then, at step S34, the image sensing unit 21 is controlled in accordance with the set resolution. More specifically, by controlling the zooming function of the lens unit 21, the zooming rate is adjusted so as to correspond to the set resolution. Thereby, the image sensing unit 21 is set to zoom in, and the image sensing area is controlled so that only the differing portion is sensed. Further, the camera controller 2 controls camera unit 1 so that the differing portion is inside of the image sensing area of the camera unit 1.

At the same time, the differing portion determination unit 14 calculates a motion vector, a difference, and so on, then by referring to data of the inputted still image of high resolution and by feeding the obtained data back to the lens controller 13 for controlling the zooming function and the camera controller 2 for controlling camera unit 1 so that difference between two images caused by the zooming becomes smaller, more precise control of resolution can be performed. Further, when a recognized differing portion is slightly offset from an actual position, it is flexibly adjusted.

Then at step S35, only an image section in the differing portion is inputted and stored in the memory 5 as a differing image section at step S36.

In this case, the differing image section can be inputted in such a manner that the whole image is divided into a predetermined number of areas, a differing portion is designated by a divided area.

The above-described processes between steps S30 to S36 in FIG. 11 corresponds to the process of specifying a differing portion and inputting an image section performed at steps S106 and S107 in FIG. 9.

Next at step S37, an image in the differing portion is extracted from the image data inputted as described above.

This extraction process is performed by using the differing portion determination unit 14, and is basically the same process as that of specifying a differing portion performed at aforesaid step S32.

It should be noted that, in the aforesaid process for specifying the differing portion at step S32, the differing portion determination unit 14 performs operation on the basis of the current image data inputted as a whole image and the reference image data, whereas, in the process for extracting the differing portion at step S37, the still image data of high resolution inputted by section at step S35 is taken as current image data, and the differing portion determination unit 14 performs operation on the basis of the current image data and the reference image data, then extracts the differing portion from the current image data.

Figure 12:
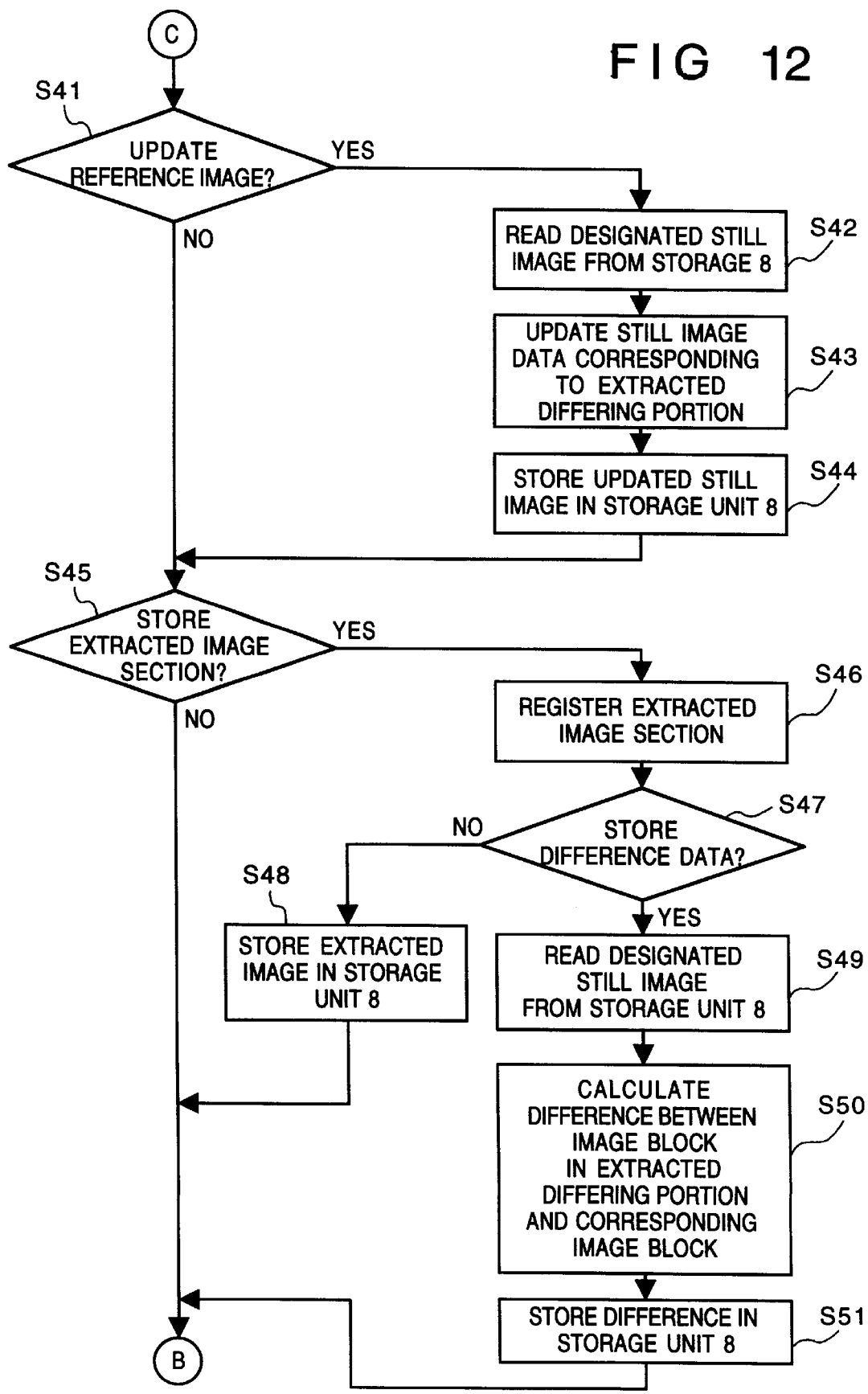
FIG. 12 is a flowchart showing detailed image inputting/storing process according to the first embodiment.

The process proceeds to step S41 shown in FIG. 12, where whether or not the differing portion of the image extracted at step S37 is to be embedded into a still image of high resolution (reference image) stored in the storage unit 8, namely, whether or not the reference image is to be updated is determined.

In a case of updating the reference image, first at step S42, the image update controller 15 searches a still image to be an object of updating process from the storage unit 8, and an area in the searched still image corresponding to the differing portion extracted as above and image data of its vicinity is read. Thereafter at step S43, an area of the still image data corresponding to the extracted differing portion is updated, then at step S44, the updated image data is written in the original still image, and stored in the storage unit 8, thereby completing updating process of the still image.

Next at step S45, whether or not the differing portion of the image extracted at step S37 is to be kept as an extracted image section is determined. In a case of keeping the differing portion, the process proceeds to step S46 where the extracted image section is registered in the management table for managing updated images.

FIG. 15 shows an example of the management table. The management table is stored in the storage unit 8, and holds a file name of the image section data to be updated, updated time for managing updated situation in time sequence, top coordinates representing for an updated image area, the numbers of pixels in both the horizontal and the vertical directions, type of updating process indicating whether the data is processed by addition to the reference image or processed by an new embedding process, or the like, and types of attributes showing storage forms, and so on, as described in FIG. 15. Items which are to be registered in the management table are not limited to above, and can be set in accordance with necessity.

Next, the process proceeds to step S47, and if it is predetermined not to store the extracted image section as difference data, the unchanged updated image is stored in the storage unit 8 at step S48. Whereas if the extracted image section is to be stored as difference data, image data corresponding to the extracted updated image and image data of its predefined vicinity is read from still images stored in the storage 8, then, difference data is calculated at step S50. Thereafter, the process proceeds to step S51 where the difference data is stored in the storage unit 8. After the difference data is stored, the process returns to step S12 in FIG. 10.

With the aforesaid configuration, it is possible to store a process of change in still images of high resolution in the storage unit 8 with respect to lapse of time, thereby capable of using the still images of high resolution as a quasi-moving image. Accordingly, the application of still images is greatly widened.

Figure 13:
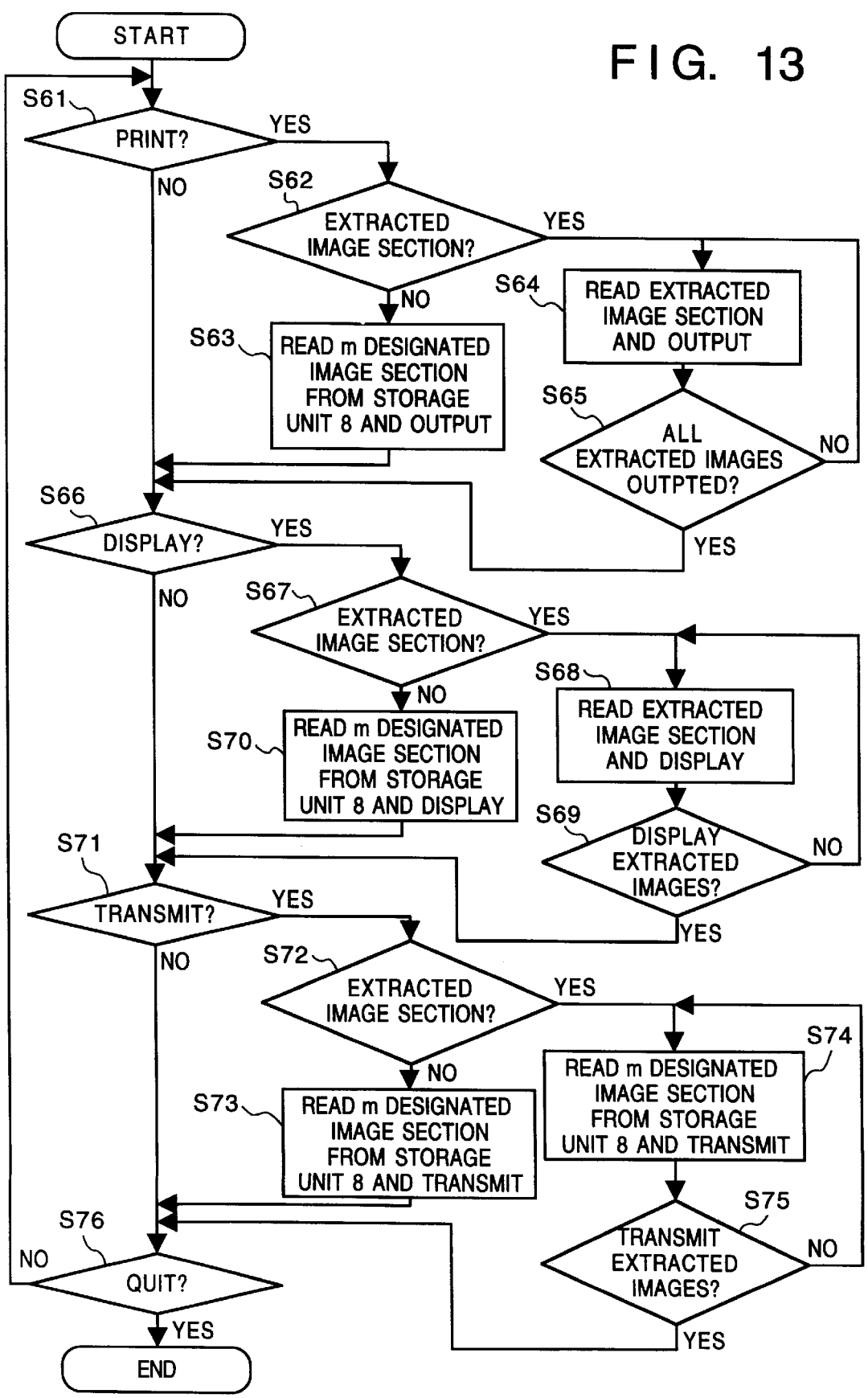
FIG. 13 is a flowchart showing image outputting process according to the first embodiment.

Next, referring to a flowchart shown in FIG. 13, an operation of outputting/transmitting process of a high resolution still image stored as described above will be described.

When it is determined at step S61 that printing is performed, the process proceeds to step S62 where whether or not the image which is designated to be outputted is an extracted image section registered in the management table is determined. If it is not, the process moves to step S63, where the predetermined number (m) of files composing a still image of high resolution designated from the input unit 105 is searched from the storage unit 8, and the file is read, transmitted to the output unit 10 and outputted.

Since the image to be outputted consists of image sections in m divided sections of a frame, these plural image sections are combined to make a single image, then the combined image is outputted to the output unit 10.

Further, if the image to be outputted is determined at step S62 that it is extracted in the differing portion determination process, then the process moves to step S64 where a designated file is searched from the management table of the updated images, shown in FIG. 15, and an extracted image corresponding to the file is read from the storage unit 8, transmitted to the output unit 10, and outputted by a printer or the like.

Next when it is selected to display an image on the display 9 at step S66, and if it is determined at step S67 that an image to be displayed has not been extracted in the differing portion determination process, the process moves to step S70 where m files composing a designated still image of high resolution is searched from the storage unit 8, and the file is read, transmitted to the display 9 and displayed.

Since the image to be outputted consists of image sections in m divided sections of a frame, these plural image sections are combined to make a single image, then the combined image is outputted to the display 9.

Further, if the image to be outputted is determined that it is extracted in the differing portion determination process, at step S67, then the process moves to step S68 where a designated file is searched from the management table of the updated images, shown in FIG. 15, and an extracted image corresponding to the file is read from the storage unit 8, transmitted to the display 9, and displayed on a CRT or the like.

Next when it is selected to transmit an image to the other terminal at step S71, and if it is determined at step S72 that an image to be transmitted has not been extracted in the differing portion determination process, the process moves to step S73 where m files composing a designated still image of high resolution is searched from the storage unit 8, and the file is read, transmitted to the communication unit 11 and transmitted to the other terminal.

Since the image to be outputted consists of image sections in m divided sections of a frame, these plural image sections are combined to make a single image, then the combined image is outputted to the communication unit 11.

Further, if the image to be outputted is determined that it is extracted in the differing portion determination process, at step S72, then the process moves to step S74 where a designated file is searched from the management table of the updated images, shown in FIG. 15, and an extracted image corresponding to the file is read from the storage unit 8, transmitted to the communication unit 11 which is a transmission means, and transmitted to a destination terminal at step S75 via a communication line.

After these processes, the aforesaid processes are repeated again or terminated.

Figure 14:
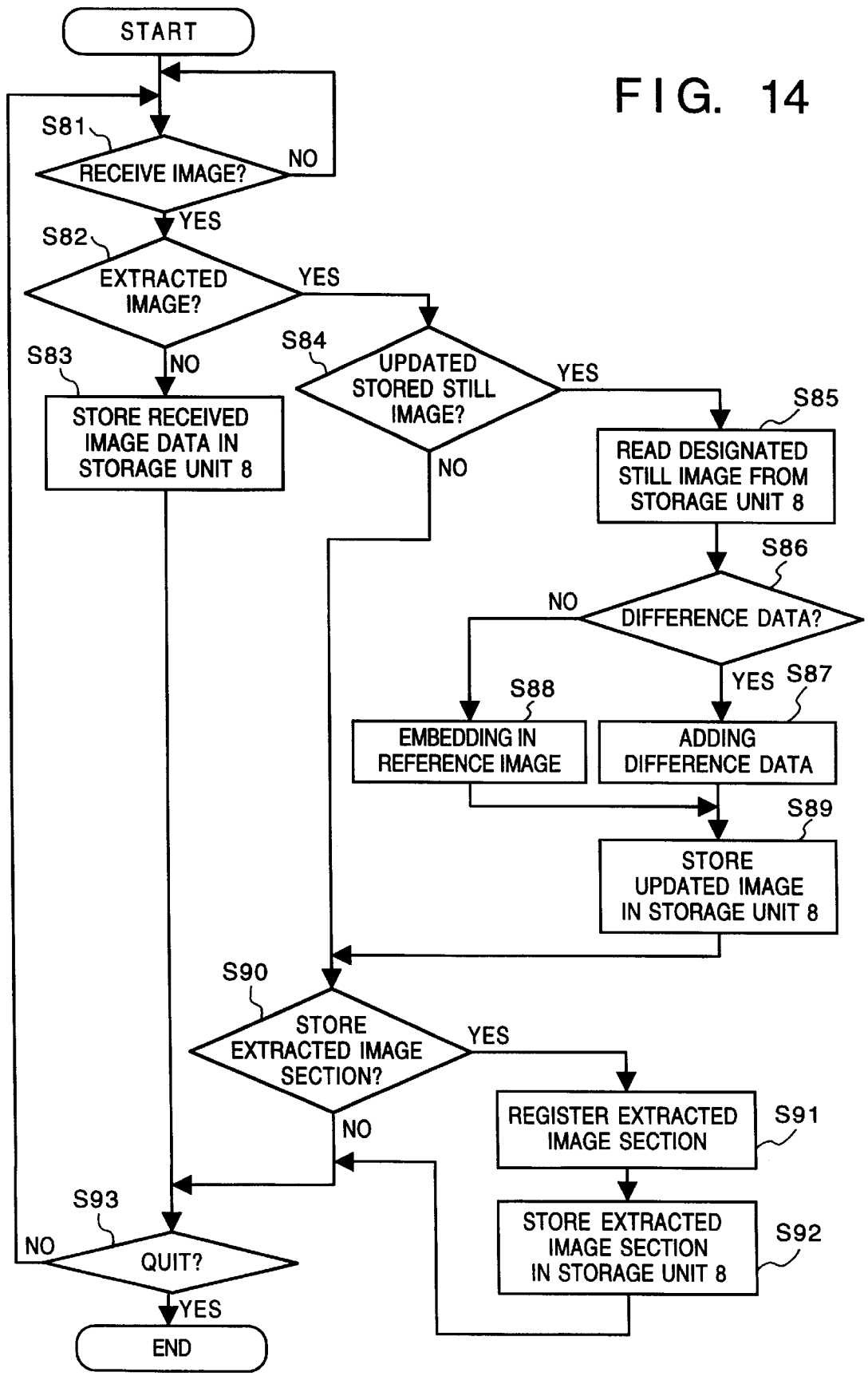
FIG. 14 is a flowchart showing image receiving process according to the first embodiment.

Next, referring to a flowchart shown in FIG. 14, an operation of receiving a high resolution still image will be explained.

First, a line to a destination terminal is connected, and, when data is received at step S81 via a communication unit 11 which is a reception means, whether or not the received image had been extracted by performing the differing portion determination process is determined at step S82. If it had not, a file name, and so on, of the received image is registered in the management table and stored in the storage unit 8 at step S83.

Whereas, if it is determined that the received image is an extracted image section, whether or not a still image which has already been stored is to be updated is determined at step S84. When the still image is to be updated, the file name is recognized from information received as communication control data, then a file of a designated high resolution still image is searched from the storage unit 8 at step S85, and the file (reference file) is read.

At that time, whether difference data is received or new data is received is checked at step S86, and when the difference data is received, the process moves to step S87 where position information of the received difference data is checked, image data located at the same position is read from image data of the reference file and added with the received difference data, then image data obtained after the addition is embedded at the same position in the reference file, thereby updating the reference file.

Further, if the received data is not the difference data, the process proceeds to step S88 where a received image data is embedded at corresponding position of image data of the reference file, thereby updating the reference file. Further, at step S89, the updated reference file is stored in the storage unit 8.

Next at step S90, if there is any image section extracted during the differing portion determination process, then the extracted image section is registered to the management table shown in FIG. 15 at step S91, further, the received extracted image section data which had been detected in the differing portion determination process is stored in the storage unit 8.

Thereafter, the aforesaid processes are either repeated or terminated.

According to the first embodiment as described above, when a plurality of still images of high resolution are stored, by storing information on a differing portion, it is possible to reduce a required memory capacity to store image data representing images. Furthermore, outputting process and communication process can be performed more effectively.

<Second Embodiment>

A second embodiment will be described below.

In the second embodiment, another difference portion determination method will be described. Note that the configuration of an image sensing apparatus used in the second embodiment is same as the one in the first embodiment, thus the explanation of it is omitted.

A brief operation of the still image inputting/storing process is same as that shown in FIG. 9 in the first embodiment. The still image inputting/storing process will be described below in detail with reference to flowcharts in FIGS. 16 to 19. Note that the process shown in the flowcharts in FIGS. 16 to 19 are stored as a control program in ROM (not shown) and the like in the main controller 7. Further, the same or similar steps in the flowcharts in FIGS. 16 to 19 are referred by the same step numbers as in the aforesaid flowcharts shown in FIGS. 10 to 12, and the explanation of those steps are omitted.

Figure 16:
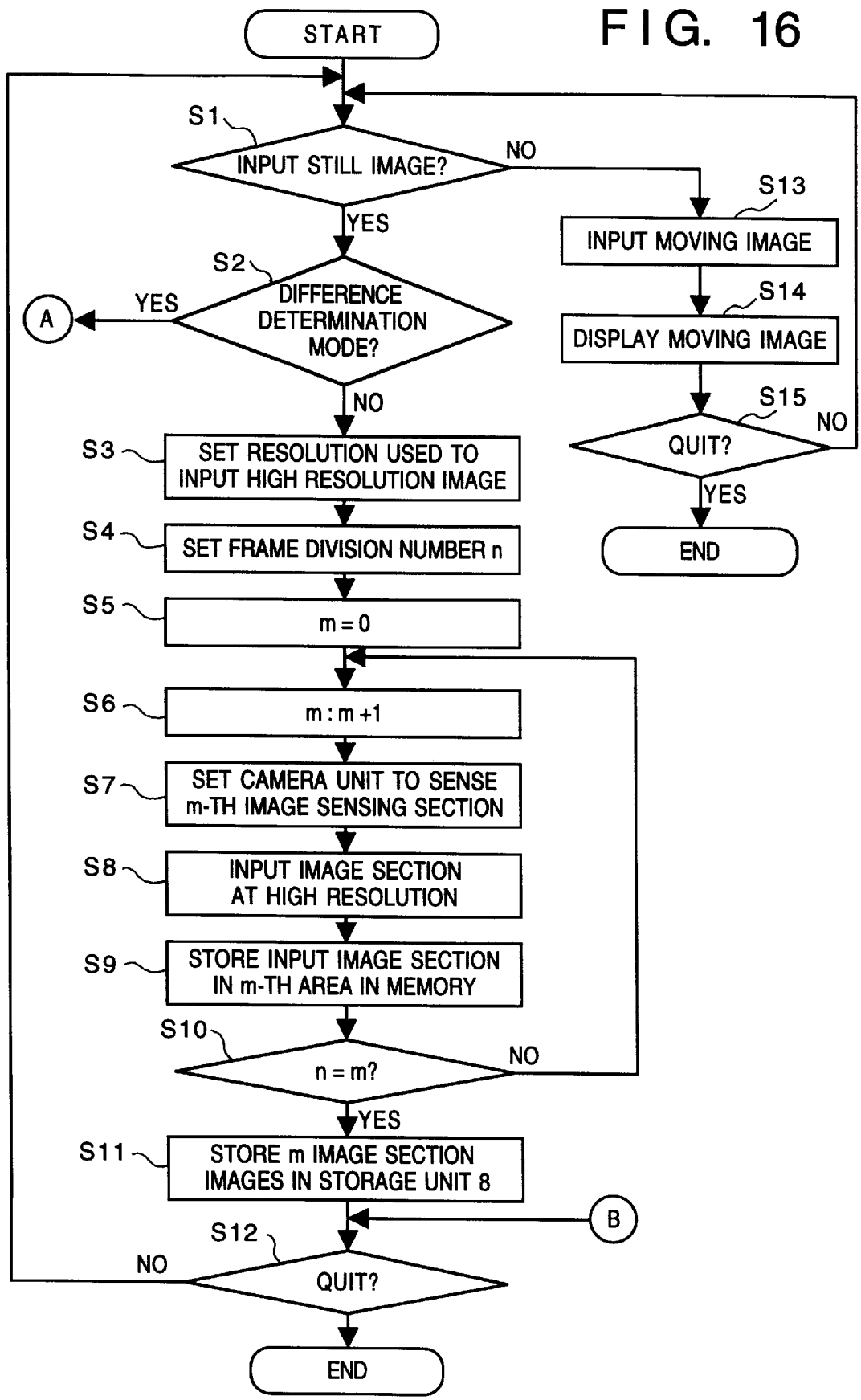
FIG. 16 is a flowchart showing image inputting/storing process according to a second embodiment.
Figure 17:
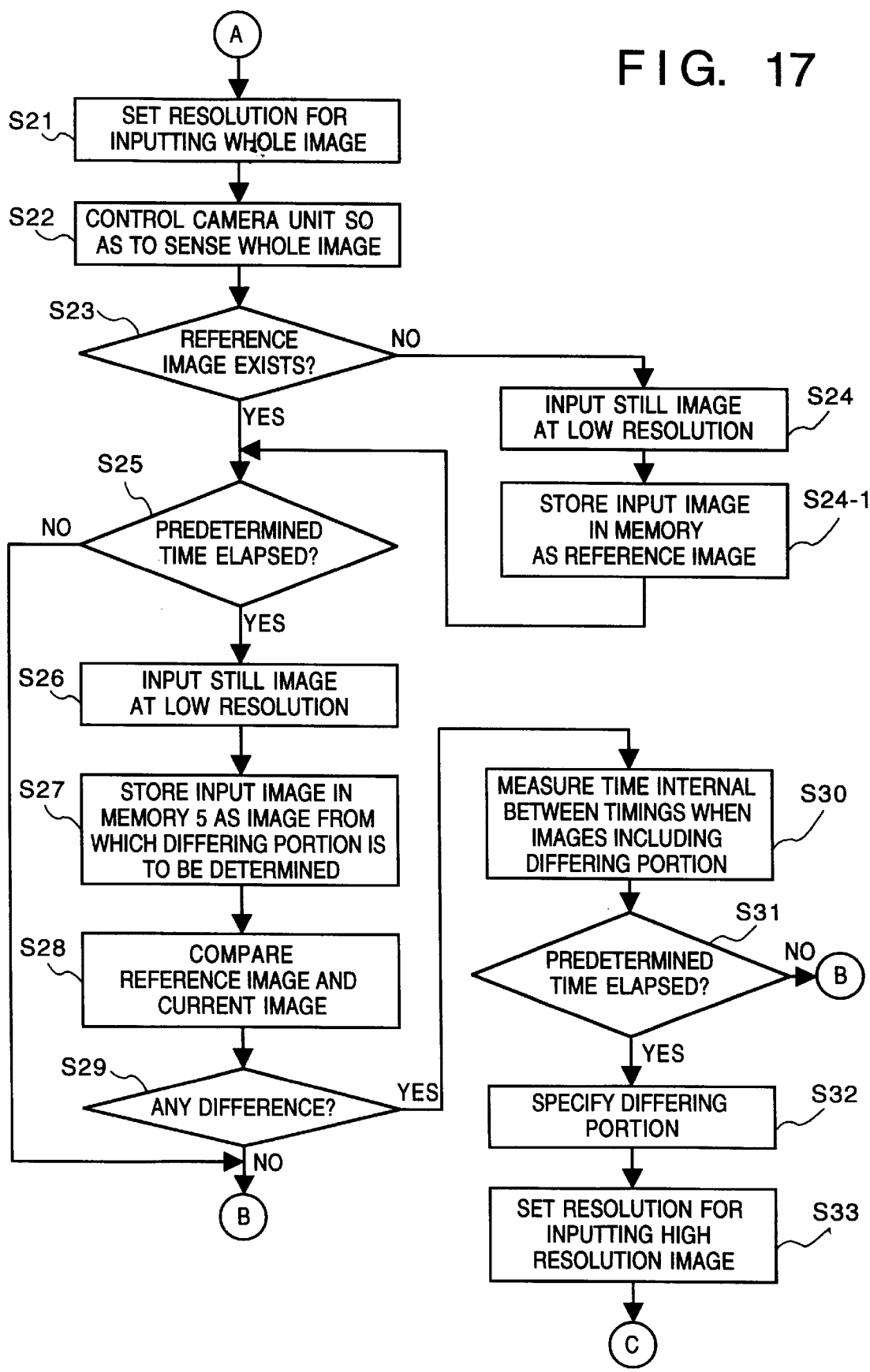
FIG. 17 is a flowchart showing image inputting/storing process according to the second embodiment.
Figure 18:
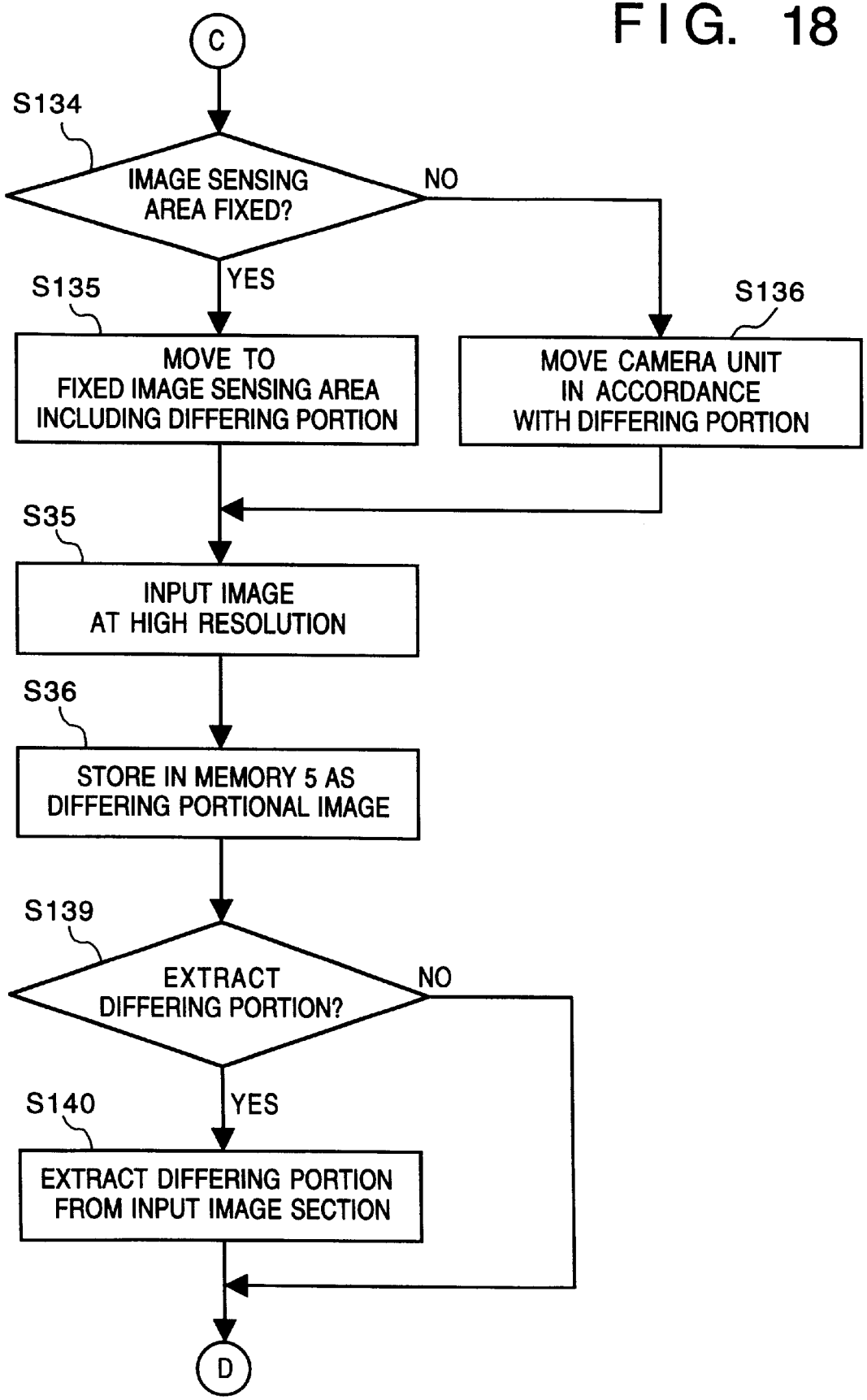
FIG. 18 is a flowchart showing image inputting/storing process according to the second embodiment.

FIG. 16 is identical to FIG. 10. Now, referring to FIG. 17, when resolution for inputting a differing portion at high resolution is set at step S33, the process proceeds to step S134 shown in FIG. 18.

At step S134, whether or not an image sensing area to be sensed by zooming in is fixed, or whether or not the image sensing area is to be limited to one of a divided sections of a frame, is determined. If the image sensing area is fixed, then the process proceeds to step S135 where one of the image sensing areas which includes a differing portion specified at step S32 is set, and the camera unit 1 is moved.

Whereas, if the image sensing area is not fixed, the image sensing area is changed and fixed so as to include the differing portion most effectively at step S136, and the camera unit 1 is moved.

Then, at step S135, an image section in the set image sensing area is inputted. Here, referring to FIG. 20, the image sensing area in the second embodiment will be explained.

Figure 20:
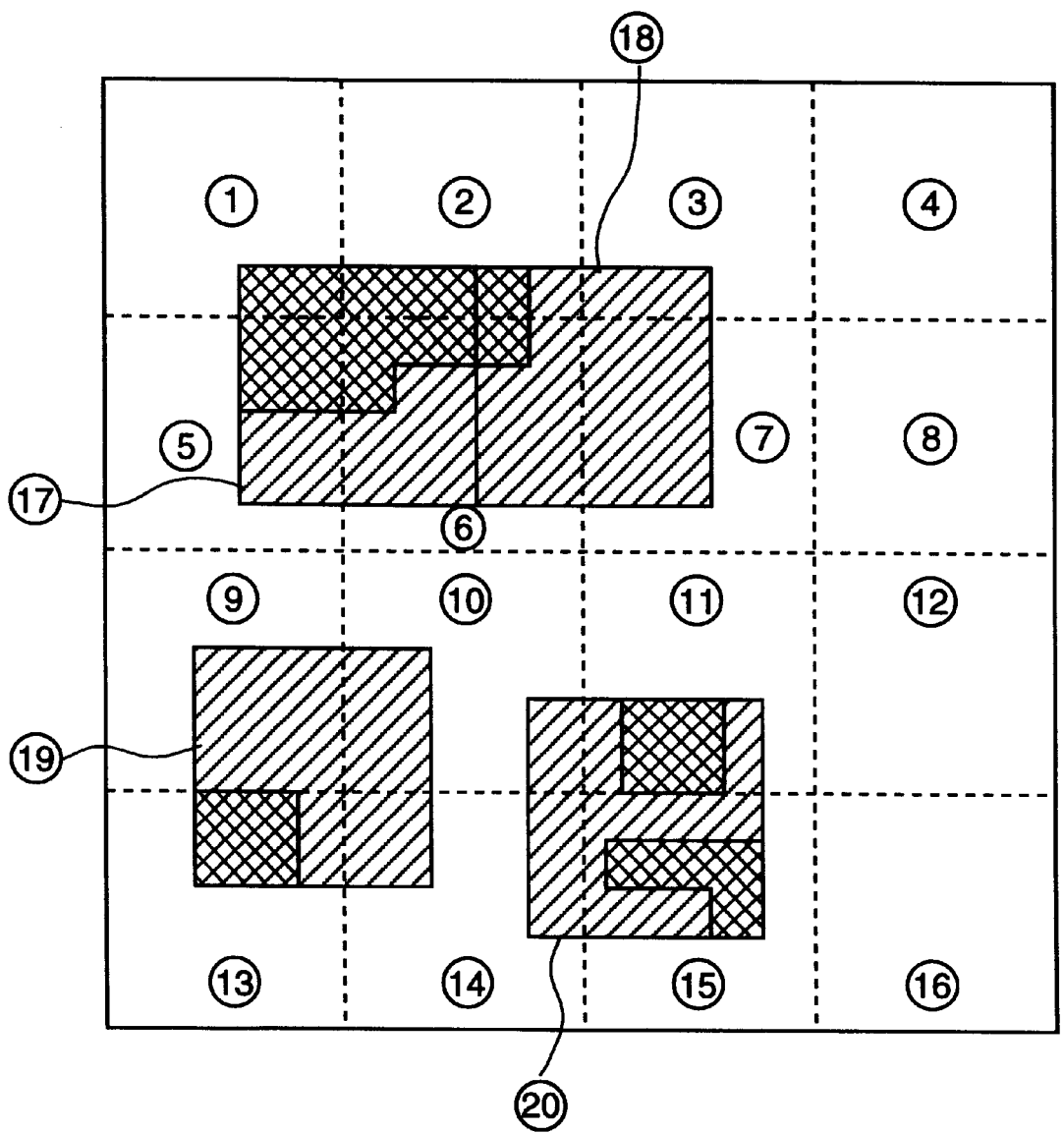
FIG. 20 shows an image sensing area according to the second embodiment.

In FIG. 20, reference numerals ① to ⑯ denote blocks (fixed image sensing area) of a divided image, and areas indicated by crossed stripe pattern are those extracted as differing portions. Then, in order to sense all the differing portions on a fixed image sensing area basis, seven image sensing areas of ①, ②, ⑤, ⑥, ⑪, ⑬, ⑮ are to be sensed, which makes seven image sensing processes.

Whereas, as controlled at step S134, when the image sensing area is flexible, then areas ⑰ to ⑳ indicated by oblique stripe pattern can be set as image sensing areas. More specifically, in order to sense the differing portions on a flexible image sensing area basis, it is possible to sense all the differing portions in four image sensing processes. Therefore, by making the image sensing area flexible, image sections of differing portions can be inputted by performing the image sensing process the minimum number of times.

However, since it is easier to manage information on an access to a memory or a position when the image sensing area is set fixed, a user may decide which image sensing area setting method is to be adopted, on the basis of an ability of an apparatus, for instance.

Then, image sections are sensed and inputted at step S35, and stored in the memory 5 at step S36.

Here, the input data includes portions which are not different from the reference image, thus at step S139, whether the input image data is to be stored unchanged or imaged data obtained by extracting only differing portion in the input image data is selected. If the image data including portion which are not different from the reference image is stored because of the convenience of managing data, the process moves to step S41 shown in FIG. 19. Whereas, in a case where image data of the extracted differing portion is to be stored so as to minimize an amount of data to be stored and to process and store the data efficiently, portions which are not different from the image data inputted at step S35 are deleted, thereby extracting image data of differing portion at step S140.

Figure 19:
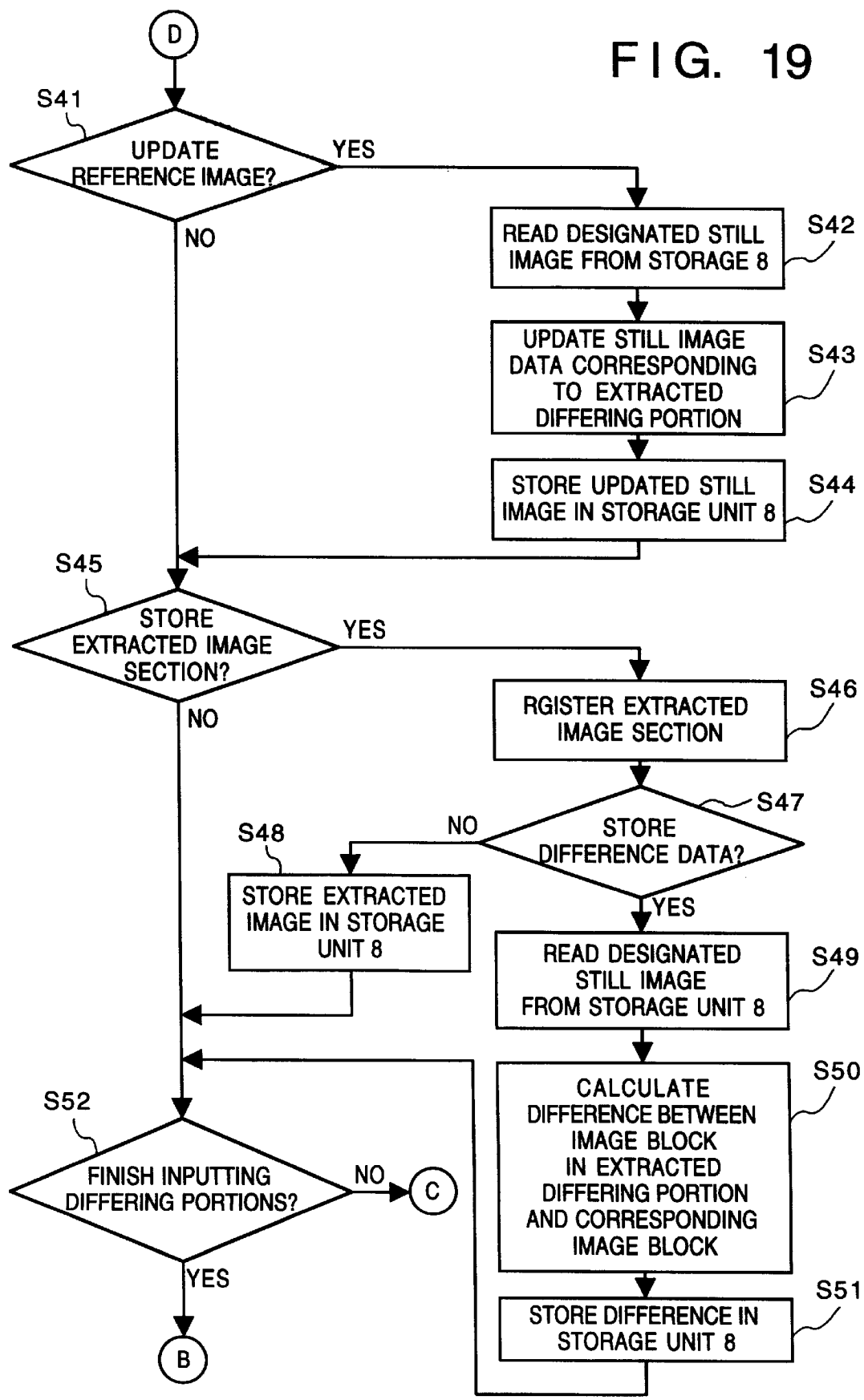
FIG. 19 is a flowchart showing image inputting/storing process according to the second embodiment.

Thereafter, the image is stored similarly to the first embodiment, then at step S52 in FIG. 19, whether or not all the images of the differing portions are inputted is determined, and if they are not, then the process returns to step S134 where the next differing portion is inputted.

According to the second embodiment as described above, by making the image sensing area of the camera unit 1 flexible in accordance with the positions of the differing portions, it is possible to input changed areas more effectively.

<Other Embodiment>

Further, the object of the present invention can be achieved by providing a storage medium storing program codes for performing processes shown in the aforesaid flowcharts, reading the program codes with a computer (e.g., CPU) of the system or apparatus from the storage medium, then executing the program. In this case, the program read from the storage medium realize the functions according to the invention, and the storage medium storing the program codes constitutes the invention. Further, the storage medium, such as a floppy disk, a hard disk, an optical disk, a magneto-optical disk, CD-ROM, CD-R, a magnetic tape, a non-volatile type memory card, and ROM can be used for providing the program codes.

Figure 21:
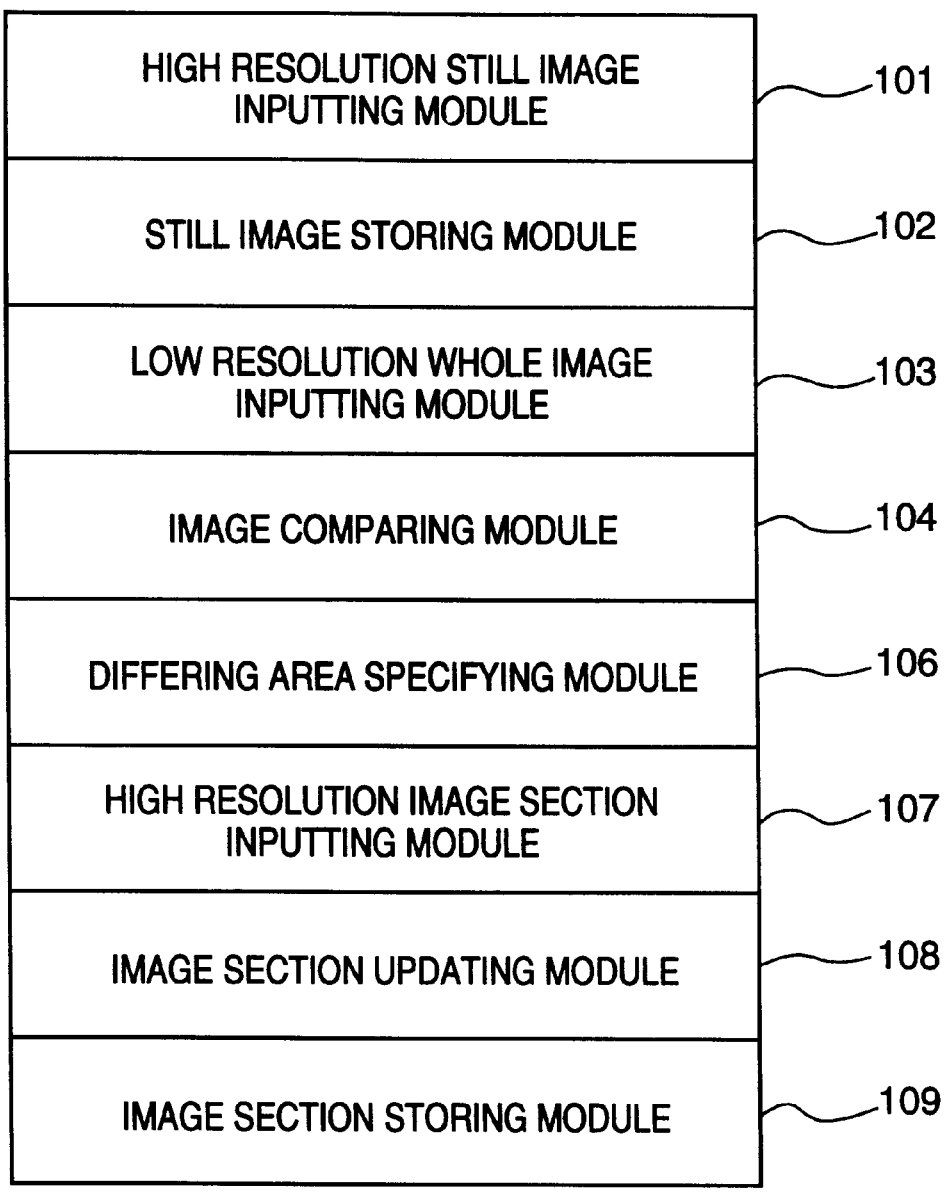
FIG. 21 shows structural features of a control program according to an embodiment.

Module of the program according to the invention are shown in FIG. 21. In FIG. 21, each module corresponds to each step in a flowchart shown in FIG. 9.

Furthermore, besides aforesaid operation in which functions of the above embodiments are realized by executing the program codes read by a computer, a case where an OS and the like working on the computer performs a part or entire processes on the basis of designations of the program codes and realizes functions of the present invention is included.

Furthermore, a case where, after the program codes read from the storage medium are written in a function extension board which is inserted into the computer or in a memory provided in a function extension unit which is connected to the computer, CPU or the like contained in the function extension board or unit performs a part or entire processes on the basis of designations of the program codes and realizes functions of the present invention is included.

The present invention can be applied to a system constituted by a plurality of devices, such as a scanner interfaces, a host computer, and the like, or to an apparatus, such as a video camera, comprising a single device.

What is claimed is:

1. An image sensing apparatus which senses an object by image sensing means and stores a sensed object image as a still image in storage means, said apparatus comprising:

first input means for inputting an image in a predetermined image sensing area in a first resolution by said image sensing means;

second input means for inputting images in the predetermined image sensing area in a second resolution which is lower than the first resolution by said image sensing means;

determination means for determining whether or riot there is a differing area between two images inputted by said second input means and, if there is, determining the differing area by comparing the two images;

third input means for inputting an image which includes the differing area in a third resolution which is higher than the second resolution by said image sensing means;

input control means for selecting either second or third input means to be used on the basis of a determination result by said determination means; and control means for controlling so as to store information on the image inputted by said third input means in said storage means.

2. The image sensing apparatus according to claim 1, wherein said control means embeds the image inputted by said third input means in an area whose position corresponds to a position of the image inputted by said third input means, in the image inputted by said first input means.

3. The image sensing apparatus according to claim 1, wherein said first input means divides the image of the predetermined image sensing area into a plurality of sections, senses images by section, and combines the images, thereby inputting the whole image in the image sensing area.

4. The image sensing apparatus according to claim 1, wherein said first input means senses the image in the image sensing area a plurality of times each time after an optical axis of said image sensing means is slightly changed, and combining the plurality of sensed images, thereby inputting the whole image in the image sensing area.

5. The image sensing apparatus according to claim 1, wherein said second input means zooms out from the object so that an image in the image sensing area can be sensed in one image sensing operation by said image sensing means, thereby inputting the image at the second resolution.

6. The image sensing apparatus according to claim 5, wherein said third input means zooms in to the object so that an image in an area including the differing area can be sensed, thereby inputting the image at the third resolution.

7. The image sensing apparatus according to claim 5, wherein the first resolution and the third resolution are the same.

8. The image sensing apparatus according to claim 7, wherein said third input means inputs an image of a smaller area than an image sensing area sensed by said first input means.

9. The image sensing apparatus according to claim 1, wherein information on the image inputted by said third input means is information on time when image is sensed.

10. The image sensing apparatus according to claim 1, wherein information on the image inputted by said third input means is position information of the differing area.

11. The image sensing apparatus according to claim 1, wherein information on the image inputted by said third input means is attribution information of the image.

12. The image sensing apparatus according to claim 1, further comprising:

designation means for designating one of a plurality of still images stored in said storage means; and output means for outputting a still image designated by said designation means, wherein said control means searches the still image designated by said designation means from said storage means, and converts the searched still image into a form to be outputted on the basis of attribution of the searched still image.

13. The image sensing apparatus according to claim 1, further comprising setting means for setting the first resolution.

14. The image sensing apparatus according to claim 1, wherein said control means controls said determination means to determine a differing area at a predetermined time interval.

15. An image sensing apparatus which senses an object by image sensing means and stores a sensed object image as a still image in storage means, said apparatus comprising:
- first input means for inputting an image in a predetermined image sensing area in a first resolution by said image sensing means;
- second input means for inputting images in the predetermined image sensing area in a second resolution which is lower than the first resolution by said image sensing means;
- determination means for determining whether or not there is a differing area between two images inputted by said second input means and, if there is, determining the differing area by comparing the two images;
- image sensing area designation means for designating an image sensing area of said image sensing means;
- third input means for inputting an image in the image sensing area designated by said image sensing area designation means which contains the differing area in a third resolution which is higher than the second resolution by said image sensing means;
- input control means for selecting either second or third input means to be used on the basis of a determination result by said determination means; and
- control means for controlling so as to store information on the image inputted by said third input means in said storage means.

16. The image sensing apparatus according to claim 15, further comprising camera control means for controlling said image sensing means so as to change an image sensing area,
- wherein said third input means inputs an image including the differing area by controlling the image sensing means by said camera control means.

17. The image sensing apparatus according to claim 16, wherein said third input means sequentially inputs images including all differing areas determined by said determination means in a smaller number of the image sensing areas.

18. An image sensing method of sensing an object and stores a sensed object image as a still image, said method comprising:
- a first input step of inputting an image in a predetermined image sensing area in a first resolution;
- a second input step of inputting images in the predetermined image sensing area in a second resolution which is lower than the first resolution;
- a determination step of determining whether or not there is a differing area between two images inputted in the second resolution and, if there is, determining the differing area by comparing two images;
- a resolution determination step of determining a third resolution to be used in sensing of a next image on the basis of a determination result in said determination step;
- a third input step of inputting an image which includes the differing area in the third resolution determined in said resolution determination step; and
- a storing step of storing information on the image inputted at said third input step when it is determined in said determination step that there is a differing area.

19. The image sensing method according to claim 18, wherein the image inputted at said third input step is embedded in an area whose position corresponds to a position of the image inputted in said third input step, in the image inputted at said first input step.

20. The image sensing method according to claim 18, wherein, at said first input step, the image of the predetermined image sensing area is divided into a plurality of sections, images are sensed by section, and the images are combined, thereby inputting the whole image in the image sensing area.

21. The image sensing method according to claim 18, wherein, at said first input step, the image in the image sensing area is sensed a plurality of times each time after an optical axis of image sensing means is slightly changed, and the plurality of sensed images are combined, thereby inputting the whole image in the image sensing area.

22. The image sensing method according to claim 18, wherein, at said second input step, the object is zoomed out so that an image in the image sensing area can be sensed in one image sensing operation, thereby inputting the image at the second resolution.

23. The image sensing method according to claim 22, wherein, at said third input step, when the third resolution to be used is determined higher than the second resolution in said resolution determination step, the object is zoomed in so that an image in an area including the differing area can be sensed, thereby inputting the image at the third resolution.

24. The image sensing method according to claim 18, wherein, in said resolution determination step, when the third resolution to be used is determined higher than the second resolution, the third resolution which is equal to the first resolution is determined.

25. The image sensing method according to claim 18, wherein, at said third input step, an image in a smaller area is inputted than an image sensing area sensed at said first input step.

26. The image sensing method according to claim 18, wherein information on the image inputted at said third input step is information on time when image is sensed.

27. The image sensing method according to claim 18, wherein information on the image inputted at said third input step is position information of the differing area.

28. The image sensing method according to claim 18, wherein information on the image inputted at said third input step is attribution information of the image.

29. The image sensing method according to claim 18, further comprising:
- a designation step of designating one of a plurality of still images stored at said storage step; and
- an output step of searching the still image designated at said designation step from storage means, converting the searched still image into a form to be outputted on the basis of attribution of the searched still image, and outputting the still image.

30. The image sensing method according to claim 18, further comprising a setting step of setting the first resolution.

31. The image sensing method according to claim 18, wherein, at said determination step, a differing area is determined at a predetermined time interval.

32. An image sensing method of sensing an object and stores a sensed object image as a still image, said method comprising:
- a first input step of inputting an image in a predetermined image sensing area in a first resolution;
- a second input step of inputting images in the predetermined image sensing area in a second resolution which is lower than the first resolution;

a determination step of determining whether or not there is a differing area between two images inputted in the second resolution and, if there is, determining the differing area by comparing two images;

an image sensing area designation step of designating an image sensing area of said image sensing step;

a resolution determination step of determining a third resolution to be used in sensing of a next image on the basis of a determination result in said determination step;

a third input step of inputting an image in the image sensing area designated at said image sensing area designation step which contains the differing area in the third resolution determined in said resolution determination step; and a storing step of storing information on the image inputted at said third input step when it is determined in said determination step that there is a differing area.

33. The image sensing method according to claim 32, further comprising a camera control step of controlling an image sensing area,
wherein, at said third input step, an image in the image sensing area, controlled at said camera control step, including the differing area is inputted.

34. The image sensing method according to claim 33, wherein, at said third input step, images including all differing areas, determined at said determination step, are sequentially inputted in a smaller number of the image sensing areas.

35. A computer program product comprising a computer usable medium having computer readable program code means embodied in said medium for realizing an image sensing method of sensing an object and stores a sensed object image as a still image, said product including:

first computer readable program code means for inputting an image in a predetermined image sensing area at first resolution;

second computer readable program code means for inputting an image in the predetermined image sensing area at second resolution which is lower than the first resolution;

third computer readable program code means for determining whether or not there is a differing area between two images inputted in the second resolution and, if there is, determining the differing area by comparing two images inputted in the second resolution;

fourth computer readable program code means for inputting an image which includes the differing area in a third resolution which is higher than the second resolution;

fifth computer readable program code means for storing information on the image inputted in the third resolution; and sixth computer readable program code means for selecting either the second or fourth computer readable program code means to be used on the basis of a determination result by said third computer readable program code means.

36. An image sensing apparatus comprising:
image sensing means capable of sensing images in a plurality of different resolutions;
determination means for determining whether or not there is a differing area between two images of a first resolution inputted by said image sensing means and, if there is, determining the differing area by comparing the two images; and control means for controlling said image sensing means to sense an image in a second resolution which is higher than the first resolution in a state that said determination means determined that there is the differing area.

37. The image sensing apparatus according to claim 36 further comprising image sensing area setting means for setting an area of an image to be sensed by said image sensing means.

38. The image sensing apparatus according to claim 36 further comprising storage means for storing an image sensed by said image sensing means.

39. An image sensing method comprising:
an image sensing step capable of sensing images in a plurality of different resolutions;
a determination step of determining whether or not there is a differing area between two images of a first resolution inputted in said image sensing step and, if there is, determining the differing area by comparing the two images; and
a control step of controlling said image sensing step to sense an image in a second resolution which is higher than the first resolution in a state that it is determined in said determination step that there is the differing area.

40. The image sensing method according to claim 39 further comprising an image sensing area setting step of setting an area of an image to be sensed in said image sensing step.

41. The image sensing method according to claim 39 further comprising a storing step of storing an image sensed in said image sensing step.

42. A computer program product comprising a computer usable medium having computer readable program code means embodied in said medium for realizing an image sensing method of sensing an object and stores a sensed object image as a still image, said product including:

first computer readable program code means for sensing an image;

second computer readable program code means for determining whether or not there is a differing area between two images of a first resolution and, if there is, determining the differing area by comparing the two images; and third computer readable program code means for controlling said first computer readable program code means to sense in a second resolution which is higher than the first resolution in a state that it is determined that there is the differing area.

43. An image sensing apparatus which is controlled by a control apparatus, comprising:
image sensing means capable of sensing images in a plurality of different resolutions,
wherein said control apparatus comprises:
determination means for determining whether or not there is a differing area between two images of a first resolution inputted by said image sensing means and, if there is, determining the differing area by comparing the two images; and
control means for controlling said image sensing means to sense an image in a second resolution which is higher than the first resolution in a state that said determination means determined that there is the differing area.

44. The image sensing apparatus according to claim 43 further comprising image sensing area setting means for setting an area of an image to be sensed by said image sensing means.

45. The image sensing apparatus according to claim 43 further comprising storage means for storing an image sensed by said image sensing means.

46. A control apparatus for controlling an image sensing apparatus capable of sensing images in a plurality of different resolutions, comprising:

determination means for determining whether or not there is a differing area between two images of a first resolution inputted by the image sensing apparatus and, if there is, determining the differing area by comparing the two images; and control means for determining a second resolution to be used in the image sensing apparatus on the basis of a determination result by said determination means and controlling the image sensing apparatus to sense an image in a second resolution which is higher than the first resolution in a state that said determination means determined that there is the differing area.

47. The control apparatus according to claim 46 further comprising image sensing area setting means for setting an area of an image to be sensed by the image sensing apparatus.

48. The control apparatus according to claim 46 further comprising storage means for storing an image sensed by the image sensing apparatus.

* * * * *

UNITED STATES PATENT AND TRADEMARK OFFICE
CERTIFICATE OF CORRECTION

PATENT NO. : 5,930,405
DATED : July 27, 1999
INVENTOR(S) : Makoto Chida.

It is certified that error appears in the above-identified patent and that said Letters Patent is hereby corrected as shown below:

Column 20
Column 9, line 7, delete "Views" and insert therefore -- views --.
Column 10, line 50, after "41." delete ",".
Column 13, line 8, delete "mage" and insert therefor -- image --.

IN THE CLAIMS

Claim 1, line 1, delete "riot" and insert therefore -- not --.

Signed and Sealed this

Twenty-first Day of November, 2000

Attest:

Q. TODD DICKINSON

*Attesting Officer*       *Director of Patents and Trademarks*